US012366201B2

(12) United States Patent
Sibbach et al.

(10) Patent No.: US 12,366,201 B2
(45) Date of Patent: Jul. 22, 2025

(54) REVERSE FLOW GAS TURBINE ENGINE HAVING ELECTRIC MACHINE

(71) Applicants: General Electric Company, Evendale, OH (US); General Electric Company Polska SP. z o.o., Warsaw (PL)

(72) Inventors: Arthur William Sibbach, Boxford, MA (US); Adam Tomasz Pazinski, Warsaw (PL)

(73) Assignees: General Electric Company, Evendale, OH (US); General Electric Company Polska Sp. z o.o., Warsaw (PL)

( * ) Notice: Subject to any disclaimer, the term of this patent is extended or adjusted under 35 U.S.C. 154(b) by 0 days.

(21) Appl. No.: 18/990,397

(22) Filed: Dec. 20, 2024

(65) Prior Publication Data
US 2025/0122830 A1 Apr. 17, 2025

Related U.S. Application Data

(63) Continuation-in-part of application No. 18/307,938, filed on Apr. 27, 2023, now Pat. No. 12,188,414.

(30) Foreign Application Priority Data

Feb. 17, 2023 (PL) .......................................... 443814

(51) Int. Cl.
F02C 6/00 (2006.01)
F02C 7/36 (2006.01)

(52) U.S. Cl.
CPC .................. F02C 6/00 (2013.01); F02C 7/36 (2013.01); *F05D 2220/323* (2013.01);
(Continued)

(58) Field of Classification Search
CPC ...... F02C 6/00; F02C 7/36; F02C 7/48; F02C 7/32; F01D 9/06; F01D 9/065; F02K 3/06; F05D 2260/21
See application file for complete search history.

(56) References Cited

U.S. PATENT DOCUMENTS 5,265,408 A 11/1993 Sheoran et al.
5,639,100 A 6/1997 Garrigues et al.
(Continued)

FOREIGN PATENT DOCUMENTS

CN 1568397 A 1/2005
CN 106014493 A 10/2016
(Continued)

OTHER PUBLICATIONS

European Patent Office, "Extended European Search Report," issued in connection with European Patent Application No. 24151475.1, dated Jun. 14, 2024, 7 pages.
(Continued)

*Primary Examiner* — Eldon T Brockman
(74) *Attorney, Agent, or Firm* — Hanley, Flight & Zimmerman, LLC

(57) ABSTRACT

An aircraft engine assembly includes a gas turbine engine having an intake channel configured to receive an incoming flow of air and form an intake flow of air, the intake channel configured to turn the received incoming flow of air from an incoming flow direction to a first axial direction of the gas turbine engine, the incoming flow direction reverse of the first axial direction, and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

20 Claims, 20 Drawing Sheets

(52) U.S. Cl.
CPC .... *F05D 2220/70* (2013.01); *F05D 2260/201* (2013.01); *F05D 2260/202* (2013.01)

(56) References Cited

U.S. PATENT DOCUMENTS

| | | | |
|---|---|---|---|
| 6,375,415 B1 | 4/2002 | Burdgick | |
| 7,360,769 B2 | 4/2008 | Bennett | |
| 7,372,175 B2 | 5/2008 | Bouiller et al. | |
| 7,789,621 B2 | 9/2010 | Dierksmeier et al. | |
| 8,176,725 B2 | 5/2012 | Norris et al. | |
| 8,278,774 B2 | 10/2012 | Macchia | |
| 8,474,900 B2 | 7/2013 | Gonin | |
| 8,641,362 B1 | 2/2014 | Liang | |
| 8,756,911 B1 | 6/2014 | Liang | |
| 9,045,216 B2 | 6/2015 | Christenson et al. | |
| 9,097,134 B2 | 8/2015 | Ferch et al. | |
| 9,169,780 B2 | 10/2015 | Barnett et al. | |
| 9,206,742 B2 | 12/2015 | Chuong et al. | |
| 9,239,029 B2 | 1/2016 | Herrmann | |
| 9,316,153 B2 | 4/2016 | Patat et al. | |
| 9,494,206 B2 * | 11/2016 | Rajasekaran | F16F 3/093 |
| 9,528,440 B2 | 12/2016 | Schott et al. | |
| 9,567,873 B2 | 2/2017 | Ueda et al. | |
| 9,915,151 B2 | 3/2018 | Weaver et al. | |
| 9,915,164 B2 | 3/2018 | Roberge | |
| 9,938,858 B2 | 4/2018 | Kingels | |
| 9,945,251 B2 | 4/2018 | Yeager et al. | |
| 9,982,564 B2 | 5/2018 | Yeager et al. | |
| 10,280,775 B2 | 5/2019 | Liebl et al. | |
| 10,308,366 B2 | 6/2019 | Kupiszewski et al. | |
| 10,458,340 B2 | 10/2019 | Lefebvre | |
| 10,465,708 B2 | 11/2019 | Clemen et al. | |
| 10,550,764 B2 | 2/2020 | Roberge | |
| 11,162,379 B2 | 11/2021 | Spierling | |
| 11,242,156 B2 | 2/2022 | Spierling | |
| 11,371,430 B2 | 6/2022 | Lents et al. | |
| 11,905,842 B2 * | 2/2024 | Sharma | F01D 9/065 |
| 12,104,533 B2 * | 10/2024 | Sharma | B22F 5/04 |
| 12,228,046 B2 * | 2/2025 | Kibsey | F01D 5/147 |
| 2009/0155050 A1 | 6/2009 | Broomer et al. | |
| 2011/0081235 A1 | 4/2011 | Shah et al. | |
| 2011/0268580 A1 | 11/2011 | Bryk et al. | |
| 2012/0274034 A1 | 11/2012 | Bouchard et al. | |
| 2013/0091850 A1 | 4/2013 | Francisco | |
| 2013/0145769 A1 | 6/2013 | Norris et al. | |
| 2013/0183136 A1 | 7/2013 | Roberge et al. | |
| 2013/0255224 A1 | 10/2013 | Kupratis et al. | |
| 2014/0079530 A1 | 3/2014 | Ferch et al. | |
| 2014/0248128 A1 | 9/2014 | Budnick et al. | |
| 2014/0248152 A1 | 9/2014 | Chuong et al. | |
| 2014/0251585 A1 | 9/2014 | Kusuda et al. | |
| 2014/0271101 A1 | 9/2014 | Slavens et al. | |
| 2014/0290272 A1 | 10/2014 | Mulcaire | |
| 2015/0240660 A1 | 8/2015 | Sonokawa et al. | |
| 2015/0267616 A1 | 9/2015 | Verseux | |
| 2015/0285095 A1 | 10/2015 | Yeager et al. | |
| 2015/0292356 A1 | 10/2015 | Yeager et al. | |
| 2015/0330248 A1 | 11/2015 | Budnick et al. | |
| 2015/0330249 A1 | 11/2015 | Budnick | |
| 2015/0330250 A1 | 11/2015 | Scott et al. | |
| 2015/0337681 A1 | 11/2015 | Scott et al. | |
| 2015/0345397 A1 | 12/2015 | Bunker et al. | |
| 2015/0369079 A1 | 12/2015 | McCaffrey et al. | |
| 2016/0025009 A1 | 1/2016 | Morenko et al. | |
| 2016/0090914 A1 | 3/2016 | Lyons | |
| 2016/0169108 A1 | 6/2016 | Peters et al. | |
| 2016/0177761 A1 | 6/2016 | Huizenga et al. | |
| 2016/0201472 A1 | 7/2016 | Okajima et al. | |
| 2016/0208647 A1 | 7/2016 | Cherolis et al. | |
| 2016/0215641 A1 | 7/2016 | Farah et al. | |
| 2016/0237854 A1 | 8/2016 | Grant et al. | |
| 2016/0245180 A1 | 8/2016 | Todorovic et al. | |
| 2016/0265439 A1 | 9/2016 | Winn et al. | |
| 2016/0281524 A1 | 9/2016 | Wilber | |
| 2016/0290226 A1 | 10/2016 | Roberge | |
| 2016/0348585 A1 | 12/2016 | Marini et al. | |
| 2017/0058684 A1 | 3/2017 | Correia et al. | |
| 2017/0107851 A1 | 4/2017 | Lefebvre et al. | |
| 2018/0003071 A1 | 1/2018 | Lents et al. | |
| 2018/0003072 A1 | 1/2018 | Lents et al. | |
| 2018/0003109 A1 | 1/2018 | Lents et al. | |
| 2019/0063324 A1 | 2/2019 | Gould et al. | |
| 2019/0271237 A1 | 9/2019 | Martin et al. | |
| 2019/0316486 A1 | 10/2019 | Roberge | |
| 2019/0345833 A1 | 11/2019 | Thornton et al. | |
| 2020/0017225 A1 | 1/2020 | Chung et al. | |
| 2020/0080434 A1 | 3/2020 | Thomas et al. | |
| 2020/0080476 A1 | 3/2020 | Plante et al. | |
| 2020/0173300 A1 | 6/2020 | Gemin | |
| 2020/0291810 A1 | 9/2020 | Spierling | |
| 2021/0231058 A1 | 7/2021 | Plante et al. | |
| 2021/0239046 A1 | 8/2021 | Muldoon | |
| 2021/0262386 A1 | 8/2021 | Makela et al. | |
| 2021/0324799 A1 | 10/2021 | Suzuki et al. | |
| 2021/0355869 A1 | 11/2021 | Lefebvre | |
| 2021/0388732 A1 | 12/2021 | Turcotte | |
| 2022/0045573 A1 | 2/2022 | Seki et al. | |
| 2022/0090507 A1 | 3/2022 | Erdmenger et al. | |
| 2022/0307418 A1 | 9/2022 | Vitt et al. | |
| 2022/0403782 A1 | 12/2022 | Menheere | |
| 2023/0243310 A1 | 8/2023 | Plante et al. | |

FOREIGN PATENT DOCUMENTS

| | | |
|---|---|---|
| CN | 107013257 A | 8/2017 |
| EP | 1548231 A2 | 6/2005 |
| EP | 2708701 A2 | 3/2014 |
| EP | 2944769 A1 | 11/2015 |
| EP | 3792465 A1 | 3/2021 |
| EP | 3808430 B1 | 8/2023 |
| FR | 2981406 A1 | 4/2013 |
| GB | 2610568 A | 3/2023 |
| WO | 2014175969 A2 | 10/2014 |
| WO | 2016086810 A1 | 6/2016 |

OTHER PUBLICATIONS

Wikipedia, "Auxetics," URL: [https://en.wikipedia.org/wiki/Auxetics], last edited Jan. 16, 2025, 7 pages.

* cited by examiner

FIG. 19B  FIG. 19C

REVERSE FLOW GAS TURBINE ENGINE HAVING ELECTRIC MACHINE

PRIORITY INFORMATION

The present application claims priority to U.S. patent application Ser. No. 18/307,938, filed on Apr. 27, 2023, which claims priority to Polish Patent Application Number P.443814, filed on Feb. 17, 2023. U.S. patent application Ser. No. 18/307,938 and Polish Patent Application Number P.443814 are hereby incorporated by reference in their entirety for all purposes.

FIELD

The present disclosure relates generally to a reverse flow gas turbine engine having an electric machine.

BACKGROUND

A gas turbine engine generally includes a turbomachine and a rotor assembly. Gas turbine engines, such as turboprop engines, may be used for aircraft propulsion. In the case of a turboprop engine, the rotor assembly may be configured as a variable pitch propeller. In some installations the gas turbine engine is oriented in a reverse flow configuration such that an air flow provided by forward motion of an aircraft is received by the gas turbine engine and turned to flow in a reverse direction through the turbomachinery of the gas turbine engine before an exhaust is discharged from the engine. Locating auxiliary components in such a reverse flow configuration remains an area of interest.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which:

FIG. 19B illustrates an example structural arrangement of an auxetic material as part of the seal structure of FIG. 19A.

FIG. 19C illustrates an example use of the auxetic material of FIG. 19B as part of the seal structure of FIG. 19A.

DETAILED DESCRIPTION

Figure 1:
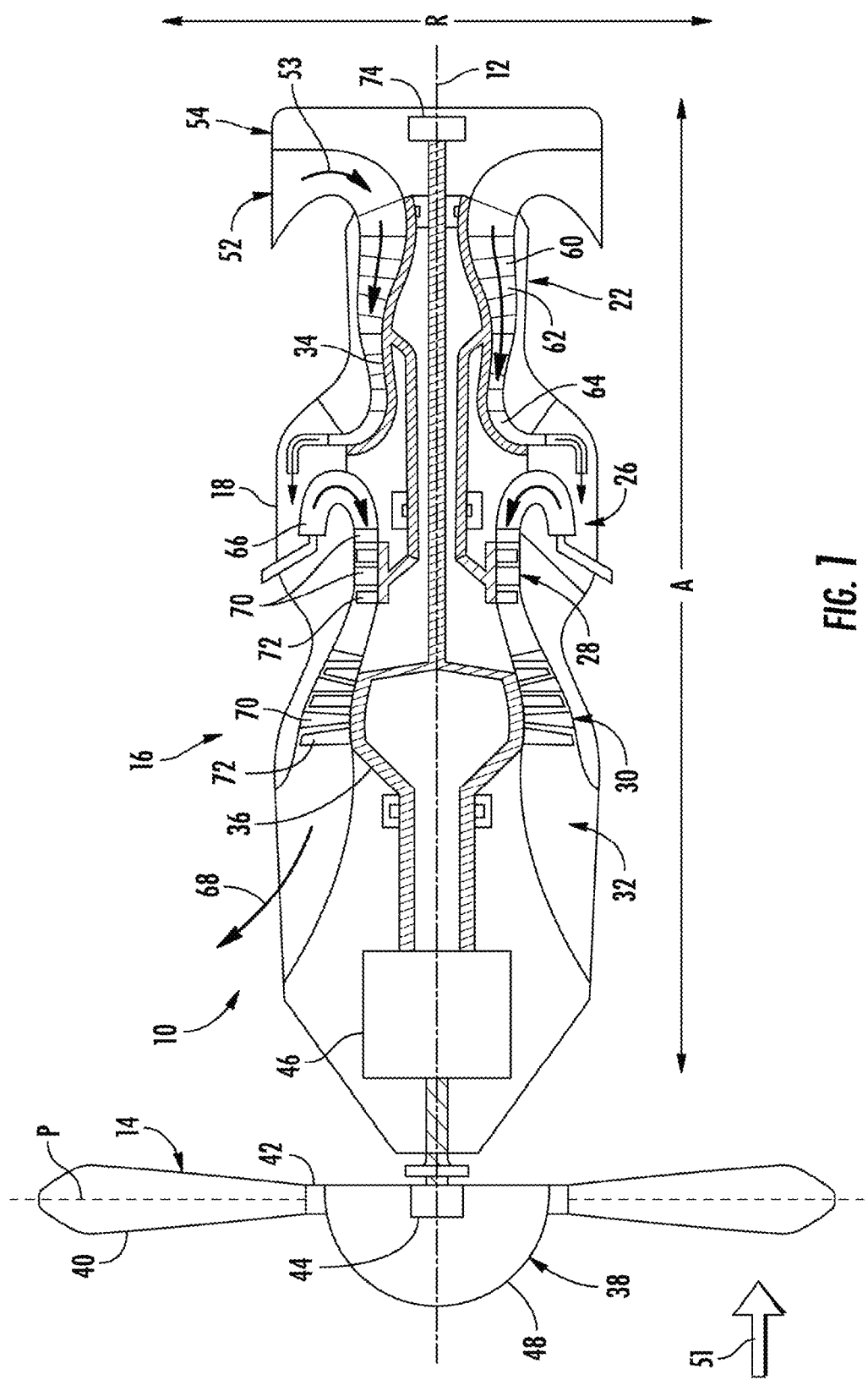
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative pressure within an engine unless otherwise specified. For example, a "low turbine" or "low pressure turbine" defines a component configured to operate at a pressure lower than a "high pressure turbine" of the engine.

The terms "forward" and "aft" refer to relative positions within a gas turbine engine or vehicle, and refer to the normal operational attitude of a vehicle such as an aircraft. For example, with regard to an aircraft, forward refers to a position closer to a nose of the aircraft and aft refers to a position closer to an empennage of the aircraft.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

As will be discussed in more detail below, the subject matter of the present disclosure is directed generally to locating an electric machine near an intake channel of a reverse flow turboprop engine at a location which is closer to an aft end of the turboprop engine than to a forward end of the turboprop engine. The electric machine is rotatingly coupled to a low pressure shaft of the reverse flow turboprop engine and as a consequence of the reverse flow configuration the low pressure shaft extends aft of a core of the turboprop engine. The electric machine can be operated as a generator and/or motor for use in either adding power to and/or extracting power from the low pressure shaft. Placement of the electric machine in the proximate location described above permits an exchange of heat between the electric machine and a flow of air traversing through an intake channel of the engine. Such exchange of heat can provide tighter packaging of the electric machine and/or higher heat generating operating demands placed upon the electric machine.

To accommodate the placement of the electric machine in an aft location in at least one embodiment, an intake channel may be provided that forms a non-annular flow path at an inlet to the intake channel which then changes to an annular flow path around the LP shaft prior to air being delivered to a compressor of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed aft of the propeller section 14 from an aircraft perspective, the propeller section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, a high pressure (HP) turbine 28, a low pressure (LP) turbine 30, and an exhaust section 32. An air flow path generally extends through compressor 22, combustion section 26, HP turbine 28, LP turbine 30, and exhaust section 32 which are in fluid communication with each other.

An HP shaft or spool 34 drivingly connects the HP turbine 28 to the compressor 22. An LP shaft or spool 36 drivingly connects the LP turbine 30 to propeller section 14 of the turboprop engine 10. For the embodiment depicted, propeller section 14 includes a variable pitch propeller 38 having a plurality of propeller blades 40 coupled to a disk 42 in a spaced apart manner. As depicted, the propeller blades 40 extend outwardly from disk 42 generally along the radial direction R. Each propeller blade 40 is rotatable relative to the disk 42 about a pitch axis P by virtue of the propeller blades 40 being operatively coupled to a suitable actuation member 44 configured to collectively vary the pitch of the propeller blades 40 in unison. The propeller blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft. 36 to a more efficient rotational fan speed and is attached to one or both of a core frame or a fan frame through one or more coupling systems. Disk 42 is covered by a rotatable front hub 48 aerodynamically contoured to promote an airflow through the plurality of propeller blades 40.

During operation of the turboprop engine 10, a volume of air 50 (also referred to as a free stream flow of air 51 prior to its encounter with the propeller 38, and referred to as an incoming flow of air 50 after passage through the propeller 38) passes through blades 40 of propeller 38 and is urged toward a radial inlet 52 of core turbine engine 16. More specifically, turboprop engine 10 includes an intake channel 54 that defines radial inlet 52 that routes an inlet portion of air 53 of the flow of air 50 from inlet 52 downstream to compressor 22. Though the inlet 52 is depicted as a radial inlet in the embodiment of FIG. 1, other configurations of inlet 52 are also contemplated. For example, the inlet 52 can also take the form of an inlet arranged in an axial direction to capture the inlet portion of air 53 of the volume of air 50. The inlet portion of air 53 of the flow of air 50 captured by the inlet 52 is referred to herein as an intake flow of air. The intake channel 54 defines the intake flow of air and generally extends from an inlet of the intake channel 54 to just upstream of the compressor 22.

The turboprop engine 10 embodiments described herein are configured as reverse flow engines. Such engines are characterized by a general relationship between the direction of the flow of incoming air 50 (such direction can be used to characterize the relative motion of air during a mode of operation of the engine 10 such as a forward thrust mode) and that of the flow of air axially through the turboprop engine 10. The flow of air through the core turbine engine 16 is generally reverse to that of the flow of incoming air 50. Turning the flow from the direction of the incoming flow of air 50 to the axial direction through the core turbine engine 16 is usually performed by the intake channel 54. The change of direction is reversed in that the bulk direction of the flow of air 50 (itself having a circumferential swirl component imparted by the propeller blades 40 in addition to a longitudinal component) is opposite, or reverse, to the bulk direction of air flow axially through the core turbine engine 16 (which itself also includes a longitudinal component but also include radial and circumferential components owing to the shape of the flow path and swirl induced by rotating turbomachinery components) during one or more phases of operation of the core turbine engine 16. Thus, it will also be appreciated that the term "reverse" is a relative comparison of the longitudinal components of the bulk flow of air 50 and bulk flow of air axially within the engine 10. Though the longitudinal direction of the flow of air 50 may not be perfectly parallel with the axial flow of air through the engine 10, it will be appreciated that the longitudinal components of the directions the flow of air 50 and the axial flow are reversed.

Compressor 22 includes one or more sequential stages of compressor stator vanes 60, one or more sequential stages of compressor rotor blades 62, and an impeller 64. Though the illustrated embodiment includes both axial and centrifugal flow compressors, in some forms the turboprop engine 10 can include just an axial flow compressor(s) or centrifugal flow compressor(s). The one or more sequential stages of compressor stator vanes 60 are coupled to the outer casing 18 and compressor rotor blades 62 are coupled to HP shaft 34 to progressively compress the air 53. Impeller 64 further compresses air 53 and directs the compressed air 53 into combustion section 26 where air 53 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of propeller section 14 through LP shaft 36. Combustion gases 68 exit turboprop engine 10 through exhaust section 32.

It will be understood that one or more rows of stator vanes 60 and 70 can be variable vanes controlled by a controller (see below with respect to controller 100) in one form. Furthermore, with particular respect to stator vanes 70, one or more rows of the stator vanes 70 can be variable.

In other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized in aeroderivative applications. Additionally, in other exemplary embodiments, turboprop engine 10 may include any other suitable type of combustor, and may not include the exemplary reverse flow combustor depicted.

The embodiment of turboprop engine 10 illustrated in FIG. 1 includes an electric machine 74 located aft of the core turbine engine 16 and rotatingly coupled to the LP shaft 36. In some forms the electric machine 74 is contained in an environmentally sealed housing which can be pressurized to minimize electrical corona and discharge effects. Further, in some forms the LP shaft 36 and electric machine 74 can be configured to rotate at a constant speed from idle to max power, with thrust of the engine 10 controlled by the variable pitch propeller 38.

Given the coaxial relationship of the LP shaft 36 with the HP shaft 34, in such an embodiment the LP shaft 36 is configured to extend aft of the core turbine engine 16, and also further aft than the HP shaft 34, despite the HP compressor 22 being the upstream-most compressor of the turboprop engine 10 (i.e., despite there being no low-pressure compressor upstream of the HP compressor 22 and downstream of the inlet 52).

The electric machine 74 can be used in many different power configurations. In one form the electric machine is configured to extract power from the LP shaft 36 when the machine 74 operates as a generator. The extraction of mechanical power from the LP shaft 36 and conversion to electric power can be used to charge an on-board power storage device such as a battery, or alternatively to provide power to another electrical device (e.g., an electric motor, an electrical accessory on an aircraft, etc.). In other forms, the electric machine 74 can be used as a motor to provide power to the LP shaft 36 to supplement power extracted by the LP turbine 30 from the combustion gases 68. In these forms, the electric machine 74 can be configured to provide a minimum of 10% of supplemental thrust to the engine 10, a minimum of 20% of supplemental thrust to the engine 10, and up to 40% of supplemental thrust to the engine 10 in various embodiments. In still other forms, the electric machine 74 can be configured to power to drive 100% of thrust from the propeller section 14. A scenario in which the electric machine 74 provides all power to the propeller section 14 can include shutdown of the engine 10. In one non-limiting example of an engine being shut down, upon or near landing the engine 10 can be commanded to shut down and the electric machine 74 used to drive further propeller thrust requirements, whether that includes fine power on short-final or power when the propeller section 14 is configured in reverse pitch to aid in slowing the aircraft.

A battery or other secondary power source can be used to provide power to the electric machine 74 when operated as a motor. The supplementation of power by the electric machine 74 to the LP shaft 36 in this manner can be transitory or steady state, depending on the control requirements requested of the turboprop engine. For example, in those operating conditions in which power output of the engine lags behind a commanded power, the electric machine 74 can provide near instantaneous supplemental power to the LP shaft 36 to provide on-condition power output from the turboprop until the engine 10 achieves a steady state operating condition at the higher output power. In still further forms, the electric machine can be operated as a motor in some portions of operation of the engine 10, and as a generator in other portions of operation of the engine 10, along the lines of any of the variations discussed herein.

Given the proximity of the electric machine 74 to the intake channel 54, the electric machine 74 can be further positioned to exchange beat with the inlet portion of the air 53 traversing the intake channel 54 to aid in removing heat from the electric machine 74. Cooling of the electric machine 74 using the inlet portion of air 53 permits tighter packaging of the electric machine 74 and closer location of the electric machine 74 to heat generating portions of the engine 10. The relative location of the electric machine 74 and intake channel 54 can permit an effective exchange of heat through any number of useful mechanisms including at least one of conduction and convection cooling. In some forms cooling air may directly impinge upon the electric machine 74 and/or may be used to vent a cavity in which the electric machine 74 is located. In still further forms the electric machine 74 can be used in part to form the flow path of the intake channel 54 to provide direct heat transfer between the electric machine 74 and the inlet portion of air 53. In yet still further forms the electric machine 74 may be in direct contact with a portion of the intake channel 54 forming the flow path such that heat transfer occurs between the electric machine 74 and inlet portion of air 53 via that particular portion of the intake channel 54 forming the flow path. Further aspects of the location of electric machine 74 and various cooling techniques are described further below.

Various other embodiments are disclosed further herein related to the location and use of the electric machine 74, the shape and configuration of the intake channel 54, and various techniques to exchange heat between the electric machine 74 and the inlet portion of air 53 flowing in the intake channel 54. As will be appreciated, like reference numerals refer to like elements and, thus, any of the variations disclosed herein related to any particular exemplary embodiment in any given figure are also applicable to embodiments depicted and discussed with respect to the other figures.

Figure 2:
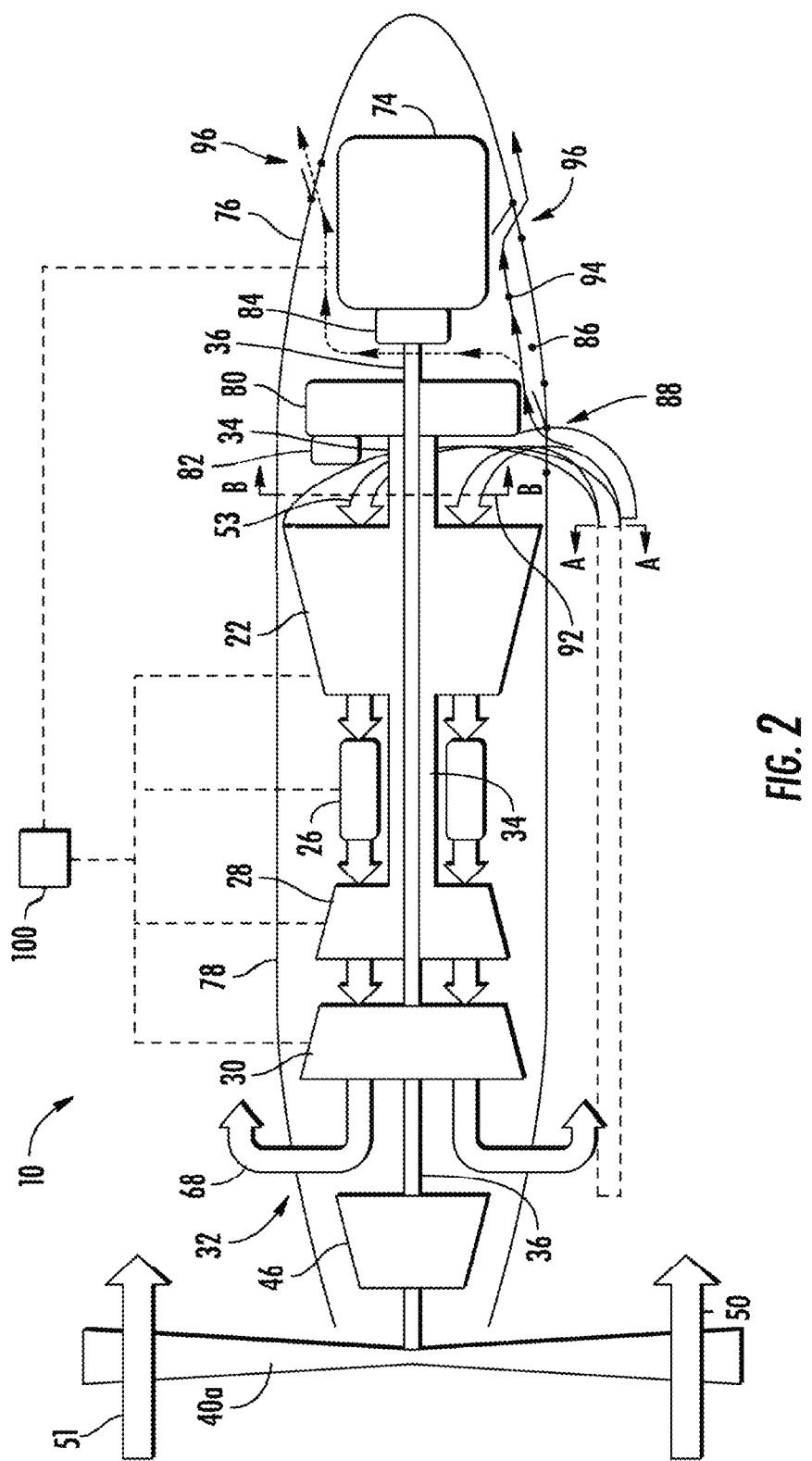
FIG. 2 is a schematic view of a gas turbine engine with an electric machine in accordance with the present disclosure.

Turning now to FIG. 2, an exemplary embodiment of the turboprop engine 10 is illustrated in which the engine 10 includes an electric machine 74 located aft of the core turbine engine 16 in a tail cone 76 defining an aft end of an engine nacelle 78. As will be appreciated, the engine nacelle 78 is used to enclose the gas turbine engine and includes one or more portions that interface with aircraft structure such as a wing, pylon, fuselage, etc. The tail cone 76 may be a complete body of revolution that circumferentially encloses the electric machine 74 in some embodiments. In alternative embodiments, however, the tail cone 76 may be a partial body of revolution or other shape that covers the electric machine to complete an enclosure with other aircraft structure (e.g., wing, pylon, fuselage, etc.). Thus, the tail cone 76 is any suitable structure of the engine nacelle which is located aft of the core turbine engine 16 and is used to wholly or partially enclose the electric machine 74.

In some forms of the embodiments disclosed herein the engine nacelle 78 may take on the form of an engine cowling when the engine 10 is installed on a single engine turboprop aircraft. In such installations the electric machine 74 can be located between the core turbine engine 16 and a firewall of the aircraft. In such installations, therefore, the engine cowling or other forebody structure of the aircraft can be used to enclose the electric machine 74.

The embodiment of FIG. 2 includes an accessory gear box (AGB) 80 located aft of the HP compressor 22 and is coupled to a starter motor 82. The starter motor 82 is coupled to the HP shaft via the AGB 80 such that during a start sequence of the turboprop engine 10 the starter motor 82 can be used to impart rotational power via the AGB 80 to the HP shaft 34. In the illustrated embodiment, the AGB 80 is depicted as being co-axial with the HP shaft 34 and LP shaft 36 (it will be appreciated that although the AGB 80 is rotatingly coupled to the HP shaft 34, it is not otherwise rotatingly coupled with the LP shaft 36). To provide such a coaxial relationship between the HP shaft 34 and AGB 80, in one form the AGB 80 is a planetary gear system in which the HP shaft 34 is coupled to a sun gear of the planetary gear system. In other forms a central gear of the AGB 80 is coupled via one or more idler gears to the starter motor 82. Other forms are also contemplated to permit a co-axial relationship between the AGB 80 and HP shaft 34. In other forms, however, the AGB 80 need not be co-axial with the HP shaft 34.

The electric machine 74 is also depicted in FIG. 2 as being coupled to the LP shaft 36 through a speed change device 84 which can be used to alter a speed ratio between the LP shaft 36 and the electric machine 74. In some forms, the speed change device 84 can be a transmission that provides a fixed speed ratio, but in other forms the transmission can provide variable speed ratios. In still other forms, the transmission can include a clutch mechanism to disengage the electric machine 74 from the LP shaft 36. Still further, although the embodiment depicted in FIG. 2 includes the speed change device 84, other embodiments need not include the device 84. In such an embodiment, the electric machine 74 is directly connected to the LP shaft 36.

Figure 7A:
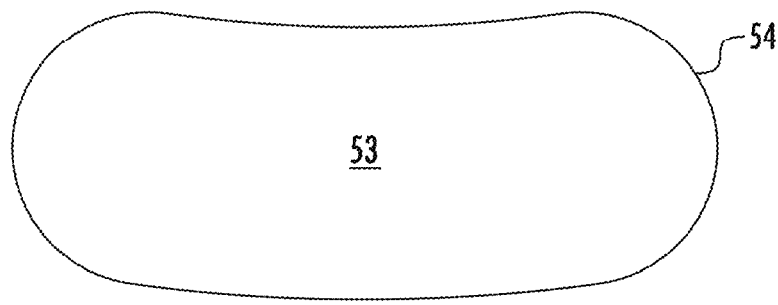
FIG. 7A is a cross sectional view of a non-annular portion of a flow path of an intake channel in accordance with the present disclosure.
Figure 7B:
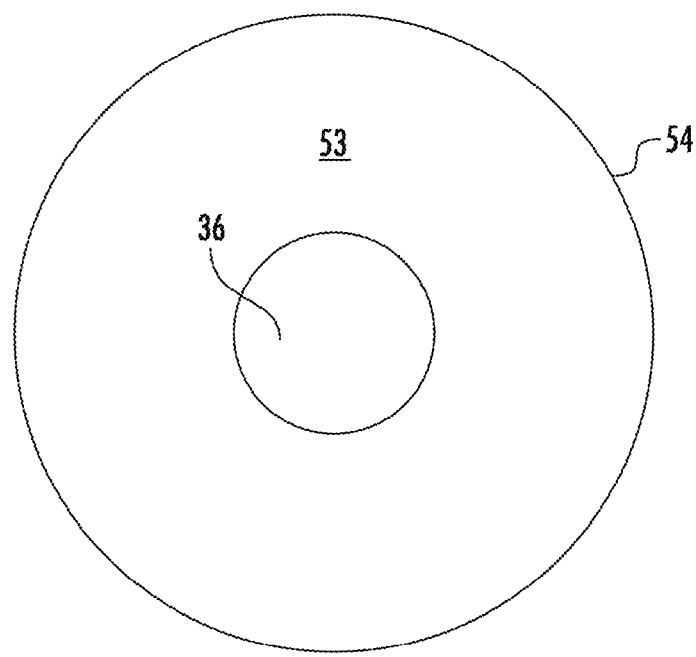
FIG. 7B is a cross sectional view of an annular portion of a flow path of an intake channel in accordance with the present disclosure.

The intake channel 54 forms a flow path between the AGB 80 and the HP compressor 22. The flow path of the intake channel 54 follows the route depicted in FIG. 2, where the inlet portion of air 53 captured by the intake channel 54 passes first through a non-annular inlet 90 depicted at sightline A-A (an embodiment of which is illustrated in FIG. 7A, discussed in more detail below) before it is split into an annular flow path 92 depicted at sightline B-B (an embodiment of which is illustrated in FIG. 7B, discussed in more detail below). The non-anular inlet 90 is radially offset from the LP shaft 36 and confined to a circumferential section about the LP shaft 36. The intake channel 54 takes the form of the annular shape leading up to the delivery of the inlet portion of air 53 to the HP compressor 22. The intake channel 54 thus begins with a non-annular intake shape and ends with an annular shape. As will be appreciated, the anular shape of the intake channel includes a central interior that accommodates the LP shaft 36. The intake channel 54 in the illustrated embodiment is thus required to morph, or change, from the non-annular shape at the inlet 90 to the annular shape at its discharge to the compressor 22 so that the intake channel 54 accommodates the intrusion of the LP shaft 36 through the intake channel 54 and to the electric machine 74. In this way, the LP shaft 36 extends through at least a portion of the intake channel 54 where the flow path in the intake channel 54 changes shape to accommodate the LP shaft 36. In some forms, an exterior surface of the LP shaft 36 may be exposed to the inlet portion of air 53 such that the inlet portion of air 53 flowing in the intake channel 54 is exposed to the rotating exterior surface of the LP shaft 36. In other forms, however, the intake channel 54 may include a separate structure used to define the central interior and which is used to separate the exterior surface of the LP shaft 36 from the inlet portion of air 53 flowing in the intake channel 54.

In some forms, the inlet 90 of the intake channel 54 is located at either a six o-clock position on the nacelle such as what would conventionally be considered the bottom, or underside, of the nacelle. An inlet on a Beechcraft Denali or Beechcraft King Air Turboprop are examples. The exhaust section 32 can be located at either or both of the three o'clock and nine o'clock position on the nacelle such as would conventionally be considered a left or right side of the nacelle. In this manner, the spacing of the inlet 90 of the intake channel 54 is circumferentially displaced from the exhaust section 32 to minimize/prevent exhaust gases from being circulated to the inlet 90 for ingestion into the engine 10. Furthermore, it will be appreciated that the inlet 52, though illustrated at an axially aft location in the various embodiments, can be located forward closer to the blades 40 while still maintaining the configuration to reverse the flow from the direction of the incoming flow of air 50 to the axial flow direction required in the turbine engine configurations depicted.

Also depicted in FIG. 2 is an offtake flow path 86 created by an offtake opening 88 provided in the intake channel 54 and which is configured to provide a flow of offtake air 94 to be used for heat exchange purposes with the electric machine 74. The offtake opening 88 can be located downstream of the inlet 90 to the intake channel 54 and is structured to remove part of the inlet portion of air 53 flowing through the offtake channel 86. The offtake opening 88 can be a permanent vent structure that includes a fixed opening through which air can pass regardless of mode of operation of the electric machine 74. In other forms, however, the offtake opening 88 can include a movable mechanical structure that permits modulating the area of the offtake opening 88, including in some forms fully closing the offtake opening. Such a movable mechanical structure can take any variety of forms such as a hinged plate, sleeve valve, or other suitable device.

The offtake flow path 86 can take a variety of forms including the solid line depicted in FIG. 2 in which the flow path 86 flows past the electric machine 74. In one form, the offtake flow path 86 can alternatively and/or additionally be routed along the dotted line shown in FIG. 2. Such a flow path can provide additional level of venting of the cavity in which the electric machine 74 is located, and/or provide greater dwell time within the cavity to ensure a higher level of heat exchange.

The offtake flow path can include one or more discharge openings 96 and 98 to permit the flow of offtake air 94 to exit from the nacelle 78. The flow of offtake air 94 can be urged to exit through a pressure differential that exists between the offtake opening 88 and the discharge openings 96 and/or 98. Such a pressure differential can be provide via ejector action if needed through suitable structure configured to provide such an action (e.g., a venturi ejector). One or both of the discharge openings 96 and 98, in some embodiments, can be a permanent vent structure that includes a fixed opening through which air can pass regardless of mode of operation of the electric machine 74.

In other forms, however, one or both of the discharge openings 96 and 98 can include a movable mechanical structure that permits modulating the area of the discharge openings 96 and 98, including in some forms fully closing the discharge openings. Such a movable mechanical structure can take any variety of forms such as a hinged plate, sleeve valve, or other suitable device. The moveable mechanical structure can protrude into a passing flow of air to which the discharged flow of offtake air 94 is being discharged, and in other forms can protrude into the offtake flow path 86.

Given the proximity of the electric machine 74 to the intake channel 54 and the configurations disclosed herein, various cooling techniques are contemplated with respect to the various embodiments. For example, though the passing flow of offtake air 94 is illustrated in FIG. 2 passing adjacent and/or around the electric machine 74, in some embodiments, the passing flow of offtake air 94 can be directed to impinge directly upon a portion of the electric machine. Further, a surface of the electric machine 74, such as an outer housing, can form part of the flow path of the offtake flow path 86. In other forms, a structure forming the offtake flow path 86 can be in heat conductive relationship with a portion of the electric machine 74 (e.g., a housing of the electric machine 74).

The embodiment depicted in FIG. 2 also includes a controller 100 configured to control various aspects of the depicted embodiment (the embodiment depicted in FIG. 1 can also include a controller for control of analogous features). As depicted through the various dotted lines, the controller 100 can control one or more different systems associated with operation of the engine 10. The dotted nature depicted in the figure denotes the optional inclusion of one or more, or all, of the systems connected with the controller 100. For example, the controller 100 can be used to control variable stator vanes 70 in either or both turbines 28 and 30. Additionally and/or alternatively, the controller 100 can be used to control variable stator vanes 60 in the compressor 22. Additionally and/or alternatively, the controller 100 can be used to control fuel flow to the combustion section 26. Additionally and/or alternatively, the controller 100 can be used to control one or more of the openings of the openings 88, 96, and 98. Additionally and/or alternatively, the controller 100 can be used to control operation of the electric machine 74. Additionally and/or alternatively, the controller 100 can command fuel flow to the combustion section 26 to be stopped and also simultaneously command the propeller section 14 to be positioned in a forward or reverse pitch configuration.

The controller 100 can thus be used in any or all of the following examples. The controller 100 may selectively drive the electric machine 74 as a generator. In those situations in which the electric machine 74 is 'powered on' to operate as a generator, the controller 100 can make adjustments to fuel rate delivery to the combustion section 26 while also optionally changing position of variable stator vanes 60 and/or 70. The controller 100 can optionally operate a clutch in the speed change device 84.

Figure 3:
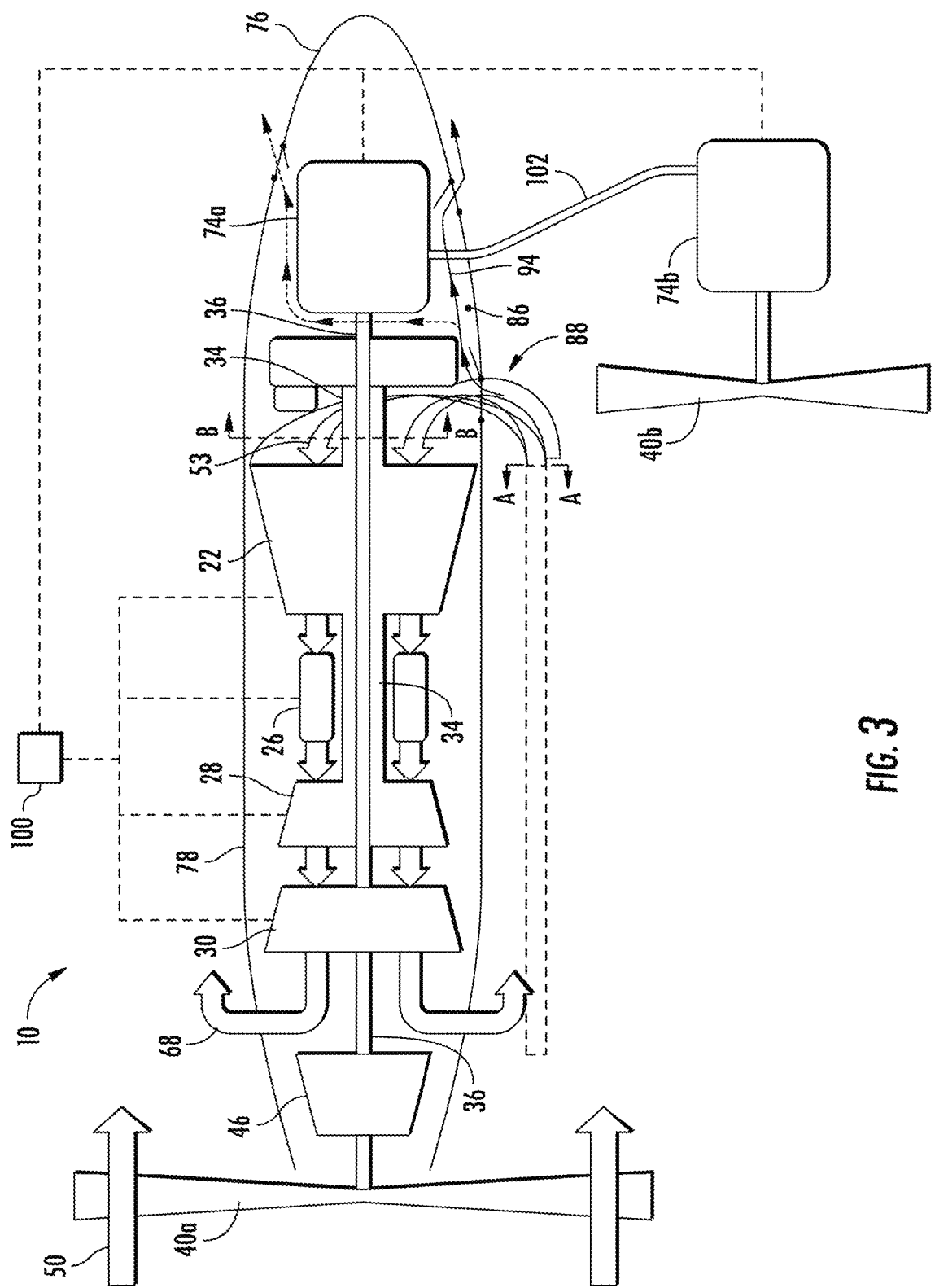
FIG. 3 is a schematic view of a gas turbine engine with an electric machine in accordance with the present disclosure.

Turning now to FIG. 3, another embodiment of the reverse flow engine 10 discussed above is illustrated. The exemplary engine 10 of FIG. 3 may be configured in substantially the same manner as the exemplary engine 10 of FIG. 2, and as such the same or similar numbers may refer to the same or similar parts.

For the embodiment of FIG. 3, the engine 10 includes an electric machine 74 coupled to the engine 10 and operated as a generator, the electric machine 74 further in electrical communication via a power conduit 102 with an electric machine 74b which is operated as a motor. The electric machine 74b operated as a motor is used to drive a set of propeller blades 40b apart from the blades 40a driven by the turbine engine 10 depicted at the top of FIG. 3. The electric machine 74b configured as a motor can be used to provide additional thrust output beyond that provided by the propeller blades 40a driven by the turbine engine 10.

Although the electric machine 74b is illustrated apart from any turbomachinery components such as those at the top of the figure, in some embodiments the electric machine 74b can be integrated with a gas turbine engine much in the same manner as the turboprop engine 10 depicted at the top of the figure. In these embodiments, the electrical coupling between the electric machines 74a and 74b can be used to exchange power between the two (e.g., where one machine is a motor and the other a generator) or can be coupled to a common energy storage device (e.g. a bank of batteries). Any of the variations in the embodiments discussed above are also applicable to the embodiments shown in FIG. 3, such as but not limited to heat exchange between the electric machine 74 and the inlet portion of air 53, the offtake flow path 86, etc.

Figure 4:
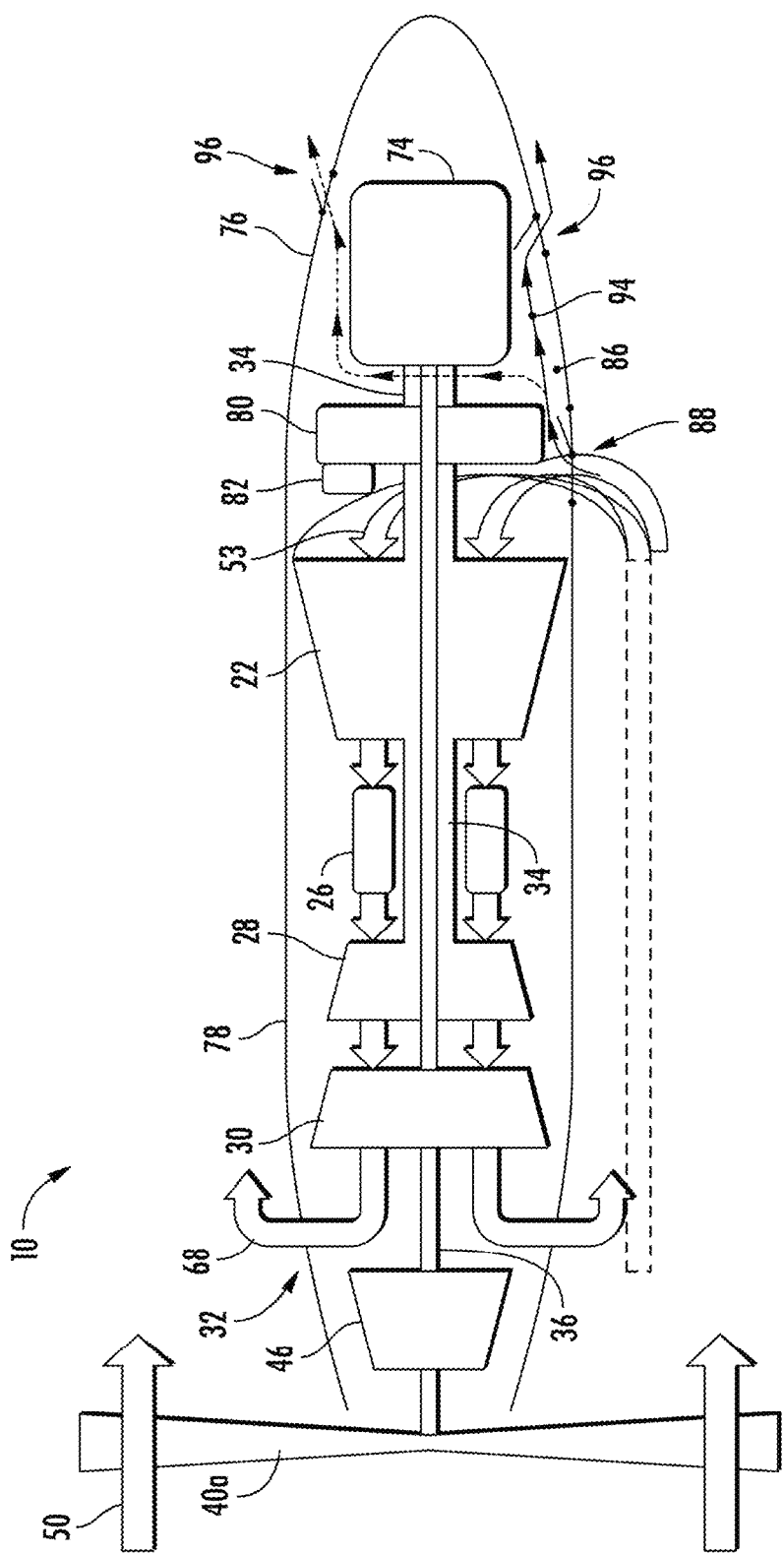
FIG. 4 is a schematic view of a gas turbine engine with an electric machine in accordance with the present disclosure.

Turning now to FIG. 4, another embodiment of the reverse flow engine 10 discussed above is illustrated. The exemplary engine 10 of FIG. 4 may be configured in substantially the same manner as the exemplary engine 10 of FIG. 2, and, as such, the same or similar numbers may refer to the same or similar parts.

For the embodiment of FIG. 4, the engine 10 includes an electric machine 74 coupled to the HP shaft 34 of the engine 10, in which the configuration can employ the electric machine 74 as either a motor (e.g., to start the engine 10) or a generator (e.g., to scavenge power for electric power generation). As will be appreciated in this embodiment, the LP shaft 36 need not be extended to the rear of the engine 10.

Figure 5:
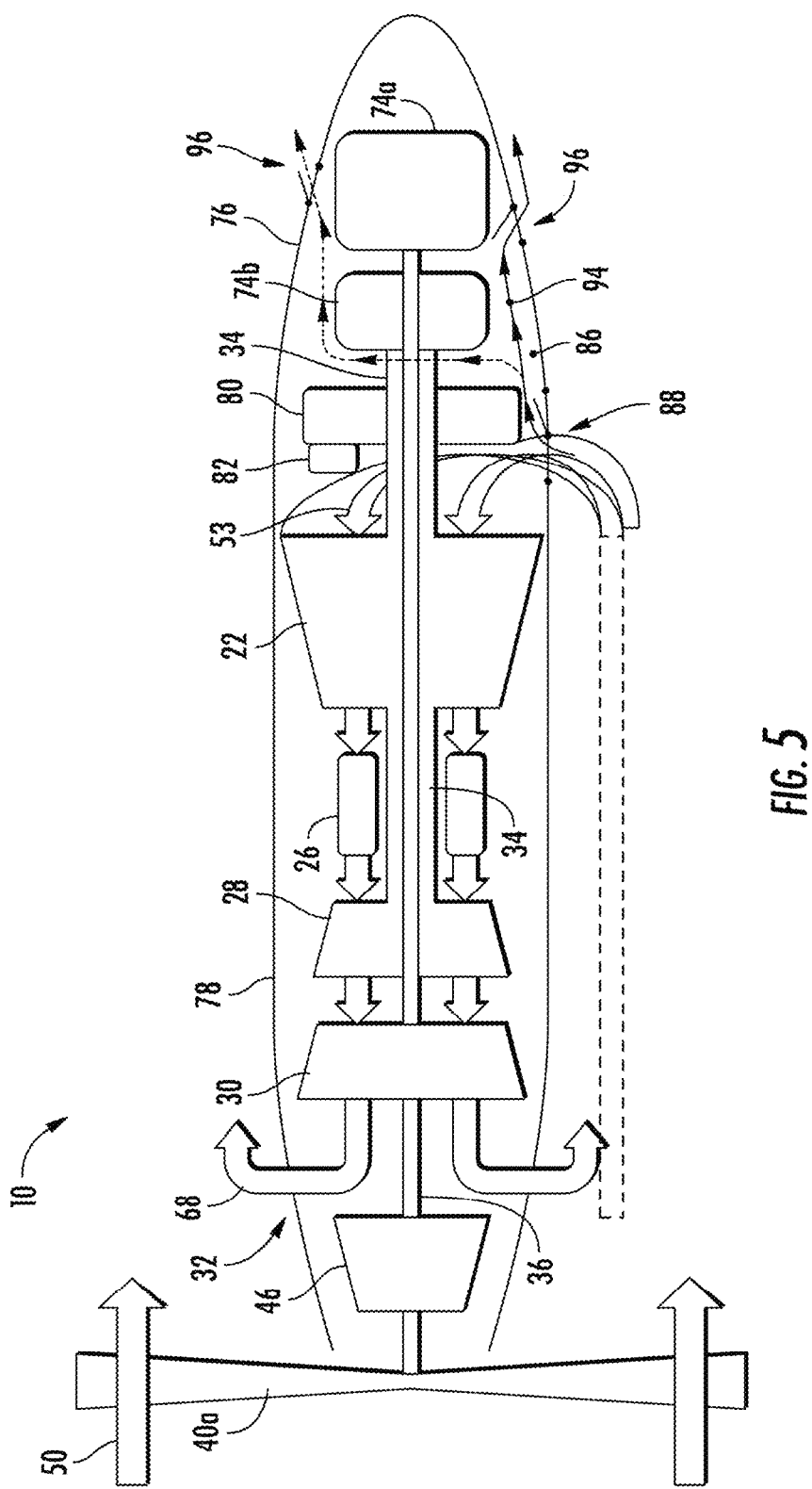
FIG. 5 is a schematic view of a gas turbine engine with an electric machine in accordance with the present disclosure.

Turning now to FIG. 5, another embodiment of the reverse flow engine 10 discussed above is illustrated. The exemplary engine 10 of FIG. 5 may be configured in substantially the same manner as the exemplary engine 10 of FIG. 2, and as such the same or similar numbers may refer to the same or similar parts.

For the embodiment of FIG. 5, the engine 10 includes electric machines 74a and 74b, each coupled with respective LP shaft 36 and HP shaft 34. This embodiment enables power input/extraction to/from either spool 34,36 independently, as well as the potential to transfer power between the two spools 34,36 of the engine to improve operability/ mitigate vibration, compressor stall or instability issues. As will therefore be appreciated, power can be extracted from spool 34 and provided to spool 36 in one mode of operation, power can be extracted from spool 36 and provided to spool 34 in another mode of operation, and power can be either extracted from of provided to both spools 34,36 in yet another mode of operation.

Any of the electric machines discussed herein are capable of being packaged so as to provide power densities suitable for use in the applications discussed herein. For example, the electric machines can have a power density ranging anywhere from greater than 3 kW/kg, greater than 5 kW/kg, and greater than 6 kW/kg.

As noted, the exemplary controller 100 useful in any of FIGS. 2-5 is configured to regulate any of the aforementioned systems such as variable stator vanes 60 and/or 70, electric machine 74, fuel flow to the combustion section 26, etc., either alone or in combination, based on a control scheme stored in the controller 100. In one or more exemplary embodiments, the controller 100 depicted in FIGS. 2 and 3 may be a stand-alone controller 100 for any of the aforementioned systems, or alternatively, may be integrated into one or more of a controller for the gas turbine engine with which the aforementioned systems are integrated, a controller for an aircraft including the gas turbine engine with which the aforementioned systems are integrated, etc.

Figure 6:
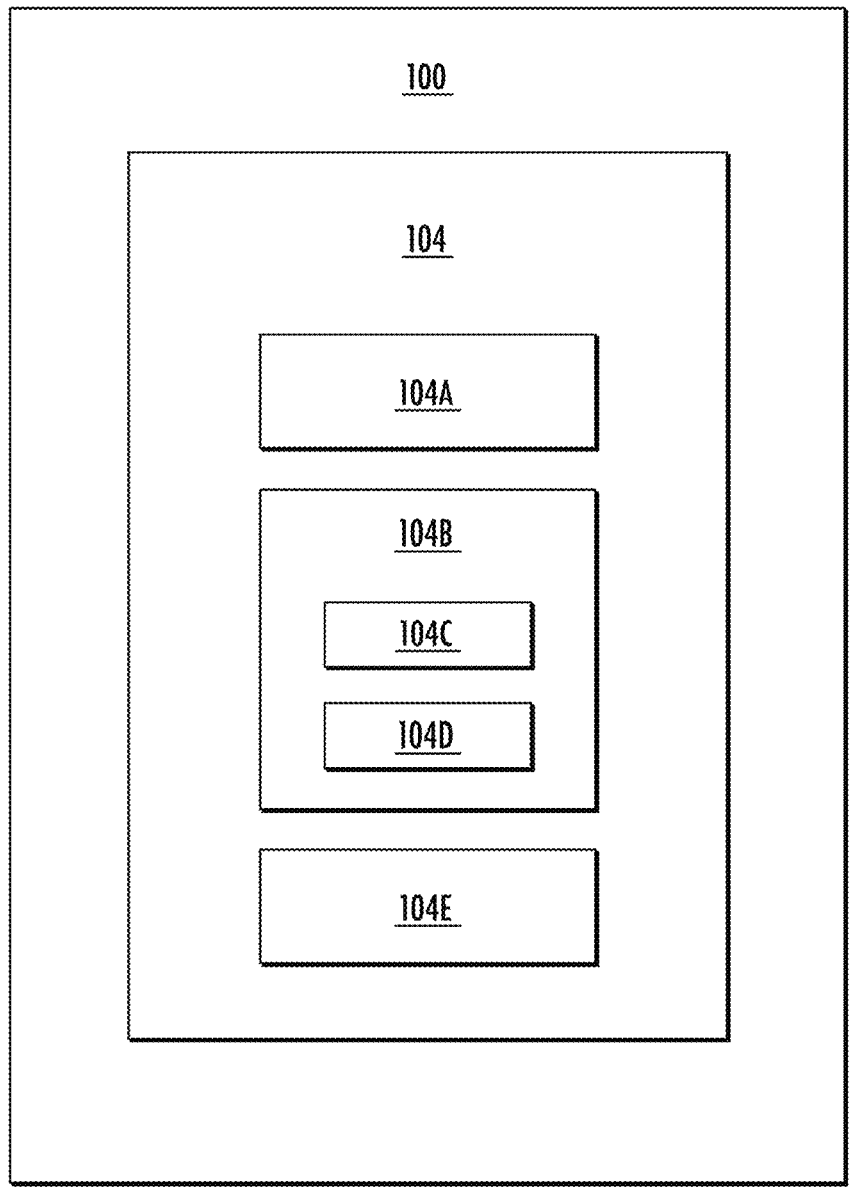
FIG. 6 is a view of a controller in accordance with the present disclosure.

Referring particularly to the operation of the controller 100, in at least certain embodiments, the controller 100 can include one or more computing device(s) 104 such as depicted in FIG. 6. The computing device(s) 104 can include one or more processor(s) 104A and one or more memory device(s) 104B. The one or more processor(s) 104A can include any suitable processing device, such as a microprocessor, microcontroller, integrated circuit, logic device, and/ or other suitable processing device. The one or more memory device(s) 104B can include one or more computer-readable media, including, but not limited to, non-transitory computer-readable media, RAM, ROM, hard drives, flash drives, and/or other memory devices.

The one or more memory device(s) 104B can store information accessible by the one or more processor(s) 104A, including computer-readable instructions 104C that can be executed by the one or more processor(s) 104A. The instructions 104C can be any set of instructions that when executed by the one or more processor(s) 104A, cause the one or more processor(s) 104A to perform operations. In some embodiments, the instructions 104C can be executed by the one or more processor(s) 104A to cause the one or more processor(s) 104A to perform operations, such as any of the operations and functions for which the controller 100 and/or the computing device(s) 104 are configured, the operations for any of the aforementioned systems such as variable stator vanes 60 and/or 70, electric machine 74, fuel flow to the combustion section 26, etc., as described herein, and/or any other operations or functions of the one or more computing device(s) 104. The instructions 104C can be software written in any suitable programming language or can be implemented in hardware. Additionally, and/or alternatively, the instructions 104C can be executed in logically and/or virtually separate threads on the one or more processor(s) 104A. The one or more memory device(s) 104B can further store data 104D that can be accessed by the one or more processor(s) 104A. For example, the data 104D can include data indicative of power flows, data indicative of engine/aircraft operating conditions, and/or any other data and/or information described herein.

The computing device(s) 104 can also include a network interface 104E used to communicate, for example, with the other components of system (e.g., via a communication network). The network interface 104E can include any suitable components for interfacing with one or more network(s), including, for example, transmitters, receivers, ports, controllers, antennas, and/or other suitable components. One or more devices can be configured to receive one or more commands from the computing device(s) 104 or provide one or more commands to the computing device(s) 104.

The network interface 104E can include any suitable components for interfacing with one or more network(s), including, for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Turning now to FIGS. 7A and 7B, cross sectional views of two separate flow stations along the flow path of the intake channel 54 are illustrated. FIG. 7A illustrates view A-A from FIGS. 2 and 3, above, which depicts a cross section of the intake channel 54 that routes an inlet portion of air 53 of the flow of air 50. The cross-section A-A depicted in FIG. 7A is at or close to the inlet of the intake channel 54 and has a non-annular flow shape. The non-annular flow shape depicted in FIG. 7A is similar to a kidney shape in the illustrated embodiment, but other non-annular shapes are also contemplated. The cross-section B-B depicted in FIG. 7B, from FIGS. 2 and 3 above, is at or close to the discharge of the intake channel 54 as it delivers the inlet portion of air 53 of the flow of air 50 to the compressor 22. The annular flow shape depicted in FIG. 7B encloses the LP shaft 36.

Figure 8:
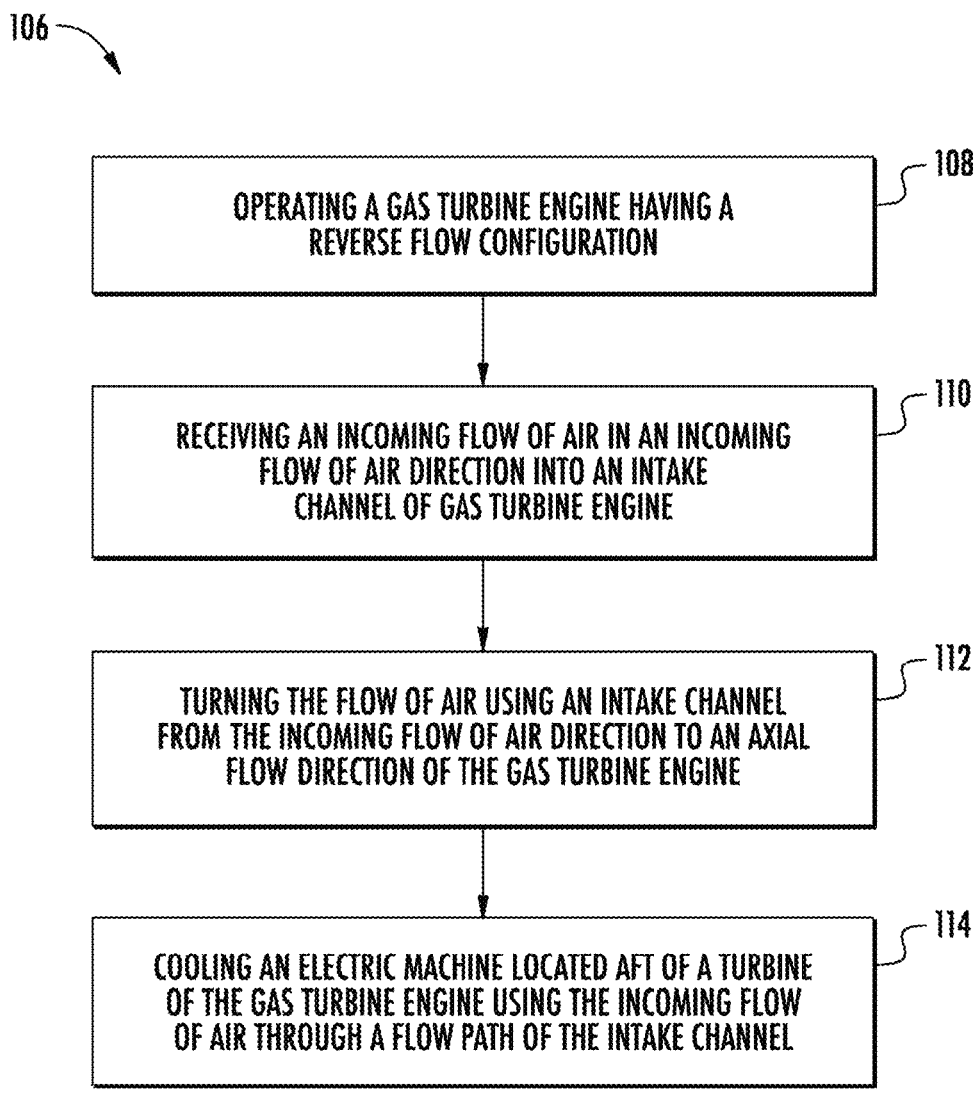
FIG. 8 is a flow chart describing a method of operating a gas turbine engine having an electric machine in accordance with the present disclosure.

Referring now to FIG. 8, a flow diagram of a method of operating a gas turbine engine in accordance with an exemplary aspect of the present disclosure is provided. The method of FIG. 7 may be utilized to operate one or more of the exemplary engine and electric machine placement described above with reference to FIGS. 1 through 5B. Accordingly, it will be appreciated that the method may generally be utilized to operate a gas turbine engine including engine 10, electric machine 74, and intake channel 54. However, in other exemplary aspects, the method may additionally or alternatively be utilized to operate any other suitable gas turbine engine.

More specifically, FIG. 8 discloses a method 106 of operating a reverse flow gas turbine engine which includes at 108 operating a gas turbine engine having a reverse flow configuration. The engine can take the form of a turboprop as discussed above in various embodiments. Step 110 includes receiving an incoming flow of air into an intake channel of the gas turbine engine. The flow of air received in the intake channel is turned at step 112 from its initial flow direction into an axial flow direction of the gas turbine engine. Step 114 discloses cooling an electric machine located aft of a turbine of the gas turbine engine using the flow of air in the intake channel.

The arrangement of the electric machine 74 coupled with the low pressure shaft 36 and located on a side of the high pressure compressor 22 opposite the high pressure turbine 28 provides various technical effects, including the ability to cool the electric machine 74 using the intake flow of air. Such a placement provides for additional separation from hot section components of the engine 10. The electric machine 74 can be placed in proximity to the intake channel 54 at an aft end of the engine 10 in a heat exchange relationship, where the intake flow of air can exchange heat through either or both of conduction and convection with the electric machine 74. In some forms an offtake flow of air can be extracted from the intake flow of air for use in cooling the electric machine 74 in lieu of the intake flow of air for additional flexibility, such as selective cooling provided through activation of discharge openings 96,98. Various other flexible arrangements can also be provided of the electric machine 74, and specifically cooling of the electric machine. For example, an electric machine 74b can be coupled with the low pressure shaft 36, while another electric machine 74a is coupled with the high pressure shaft 34. Both of electric machines 74a and 74b can be located on a side of the high pressure compressor 22 opposite the high pressure turbine 28.

It will further be appreciated that, during operation, a turbine engine is exposed to high temperatures, high pressures, and high speeds. A turbine frame, such as a turbine center frame (TCF), acts as a supporting structure in the turbine engine, connecting a high-pressure shaft's rear bearing with the turbine housing and forming an aerodynamic transition duct between the high-pressure turbine and the low-pressure turbine. When the turbine engine is implemented as a jet engine, shafts can be supported by a minimum of two bearings, with one bearing (e.g., a thrust ball bearing) to support axial and radial loads, and another bearing (e.g., cylinder roller bearing) to support radial loads. Given that bearing loads are transferred to the outer casing through the turbine frame structure, this area is subject to very high stresses. As such, the turbine frame must be able to withstand the resulting loads, in addition to being able to permanently withstand temperatures in excess of 1,000 degrees Celsius. Given the high temperatures, materials used for turbine frame(s) (e.g., turbine center frame (TCF), turbine vane frame (TVF), turbine mid frame (TMF), and/or a turbine rear frame (TRF)) should have high temperature tolerance and a low coefficient of thermal expansion, given that the capability to use materials able to withstand higher operating temperatures within the engine allows for higher engine efficiency.

A turbine frame can route the flow of hot gases exiting the high-pressure turbine past structural components and tubes toward the low-pressure turbine using flow path hardware (e.g., fairings). However, flow path structure or hardware, such as fairings, that are uncooled or inadequately cooled are limited in their capacity to withstand high temperatures commonly present in turbine frames. Such uncooled flow path structure limits the ability of flow path hardware to withstand higher operating temperatures. Certain example embodiments further provide methods and apparatus for improved gas turbine flow path hardware cooling allow for increased tolerance of the gas turbine engine to higher operating temperatures. By incorporating cooling structures inline between the high pressure turbine 28 and the low pressure turbine 30, efficiency of the low pressure turbine 30 and overall engine 10 performance can be improved, while also improving durability of the engine 10 hardware. As such, certain example embodiments provide gas turbine engine flow path hardware that permits increased operating temperatures.

Figure 9:
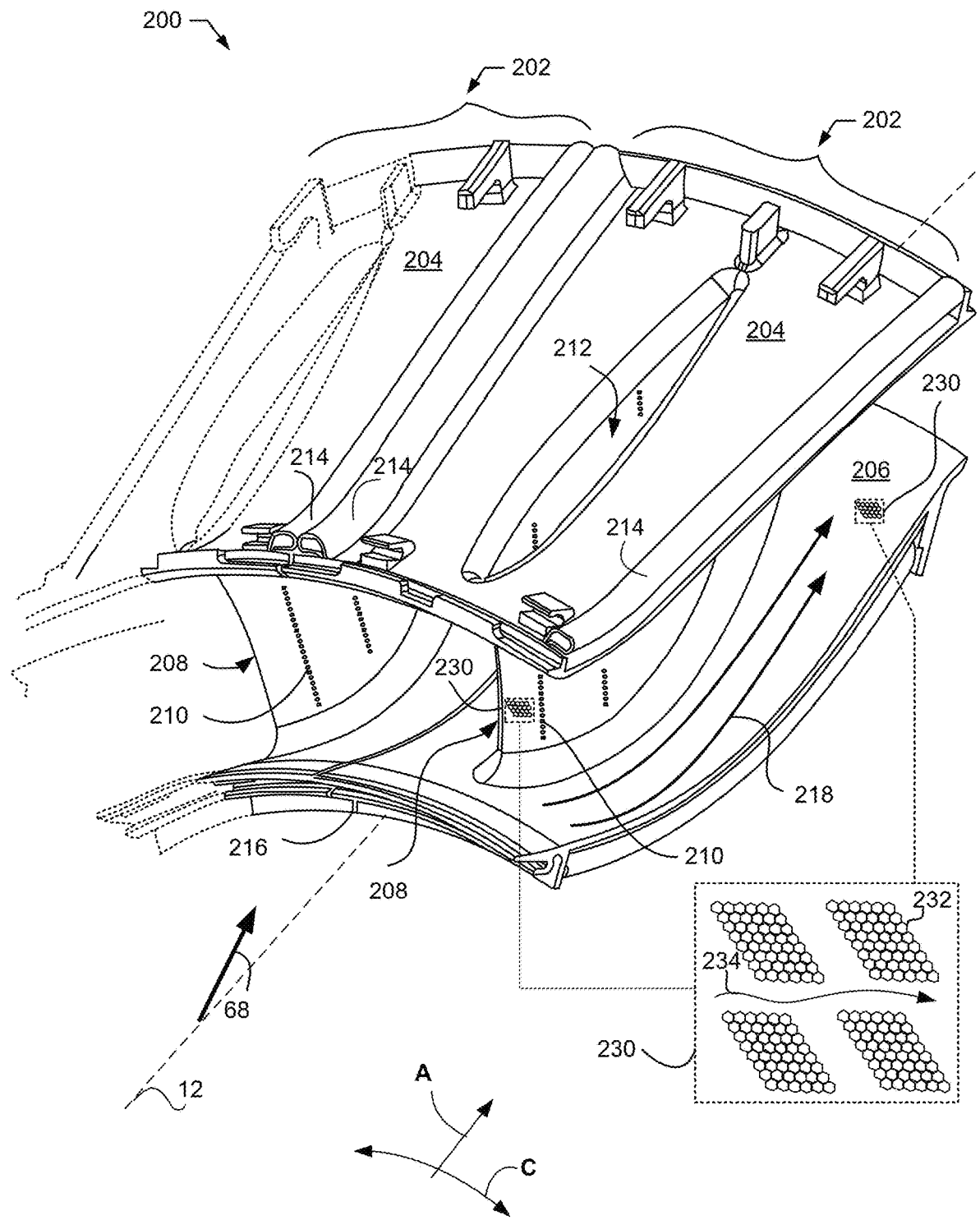
FIG. 9 illustrates an example upper perspective view of a partial turbine fairing assembly that can be utilized within the example gas turbine engine of FIG. 1.

FIG. 9 illustrates, in greater detail, an example upper perspective view of a partial turbine fairing assembly 200 that can be utilized within the gas turbine engine of FIG. 1 (e.g., between the HP turbine 28 and the LP turbine 30). The turbine fairing assembly 200 can be included in both ducted and unducted engine configurations. The turbine fairing assembly 200 includes flow path hardware components (e.g., vanes) used to cool the fairing assembly 200 during operation of the gas turbine engine 10 operation. As depicted therein, the turbine assembly 200 defines an axial direction A and a circumferential direction C. In general, the axial direction A extends generally parallel to the longitudinal axis 12, and the circumferential direction C extends concentrically around the longitudinal axis 12.

The fairing assembly 200 is located between the HP turbine 28 and the LP turbine 30 (e.g., positioned between a high pressure spool and a low pressure spool), providing a flow path 218 between the turbines that allows for passage of the hot combustion gases 68 originating from the HP turbine 28. The fairing assembly 200 extends circumferentially about the engine centerline axis 12. In the example of FIG. 9, the fairing assembly 200 includes example fairing(s) 202. Fairing(s) 202 include an outer band 204 and an inner band 206, with vane(s) 208 positioned in between the outer band 204 and the inner band 206. The outer band 204 and the inner band 206 have circumferential lengths at a forward end of the fairing 202 that are less than their circumferential lengths at an aft end of the fairing 202, while the outer band 206 has a circumferential lengths at the aft end of the fairing 202 and the forward end of the fairing 202 that are greater than the circumferential lengths of the inner band 204 at the aft and forward ends of the fairing 202. The outer band 204 includes edges 214 formed to create a seal between each of the fairings 202 that are part of the fairing assembly 200, as described in more detail in association with FIGS. 19A-19D. The edges 214 of the outer band extend between the forward end and the aft end of the fairing 202. In some examples, the edges are formed in the shape of a hair-pin structure, as shown in FIG. 9. The inner band(s) 206 of the fairing(s) 202 are also positioned together to create a seal 216 (e.g., using the hair-pin structure-shaped edges 214). As such, the adjacent fairing(s) 202 can be connected using the edges 214 to form a continuing, circumferentially extending structure that forms the fairing assembly 200.

The vane(s) 208 positioned between the outer band 204 and the inner band 206 can have the shape of an airfoil, forming a leading edge (e.g., at the forward end of the fairing 202) and a trailing edge (e.g., at the aft end of the fairing 202). The vane(s) 208 can have a hollow, airfoil-shaped hollow interior 212 to allow for positioning of a strut within the fairing 202, as shown and described in connection with FIG. 16. In FIG. 9, the hollow vane 208 can have a double-walled structure.

The double-walled structure of vane 208 includes openings 210 for passage of cooling air flow to cool the fairing 202. In some examples, the fairing(s) 202 can be uncooled, depending on the intended operating temperatures and/or the materials selected for use in fairing assembly 200. However, given high operating temperatures in excess of 1,000 degrees Celsius, the fairing assembly 200 should have high temperature capability and a low coefficient of thermal expansion, using materials that are able to withstand higher operating temperatures within the engine to allow for higher engine efficiency. As such, in some examples in which the fairing(s) 202 are cooled, the fairing vane(s) 208 include openings 210 for passage of cooling air flow from the outer band 204 to the airfoil of the fairing 202 formed by the vane 208 (e.g., with a leading edge and a trailing edge). Given the high temperatures of the hot combustion gas flow path 218 passing between the vane(s) 208 of the fairing(s) 202, the presence of cooling air provided via the vane openings 210 reduces the temperature, allowing use of lower grade materials for the flow path hardware (e.g., fairings 202) and/or use of higher flow path temperatures (e.g., higher operating temperatures).

In some examples, the thickness of the fairing 202 of FIG. 9 can range from 40-110 mil (e.g., 0.04-0.1 inches) and the vane openings 210 can be 15-45 mil in size (e.g., 0.015-0.045 inches in diameter) for providing cooling air to the vane and/or the rest of the fairing (e.g., between the outer band 204 and the inner band 206 of the fairing 202). However, any opening diameter, size, and/or layout can be used in order to effectively increase cooling of the turbine frame and/or any turbine frame component while reducing the amount of cooling flow needed to, for example, improve a specific fuel consumption (SFC).

In some examples, the openings 210 can be positioned circumferentially along the vane(s) 208 and have a varying number of openings 210 on each column of aligned openings (e.g., a column of openings having a total of 20 openings aligned vertically together, with the number of openings in the column depending on the height of the vane 208 in a given location). The number of vane openings 210 can vary depending on the total intended bulk temperature reduction (e.g., intended rate of cooling) as a result of the opening(s) 210 providing cooling air to the fairing 202. The fairing 202 can be formed using a single-piece design, such that the fairing is not segmented and/or split.

In FIG. 9, the fairing 202 structure (e.g., outer band 204, inner band 206, and/or vane 208) can include a lattice structure 230. Cooling flow 234 along the lattice structure area(s) 232 can be used to control the bulk flow path hardware temperature. The lattice structure area 232 layout (e.g., lattice structure orientation) can be determined based on the structure that permits increased rate of heat transfer, higher load carrying capacity, increased access to cooling flow, and lower weight of the fairing structure. Design of the lattice structure 230 can be optimized or otherwise improved by designing the lattice structure 230 to permit increasing a heat transfer coefficient (e.g., increasing the surface area to increase heat transfer rate), reduce pressure drops (e.g., forming a smooth passage for cooling flow 234), reduce a weight of the fairing structure (e.g., higher void structure), and/or increase strength (e.g., lattice positioned close enough to provide higher strength to take various loads). Additionally, the lattice structure can also be designed to reduce vibrations that can lead to increased fatigue damage of the engine components. The lattice geometry can vary depending on the design specifications, and is not limited to the geometry presented in the example of FIG. 9. The lattice structure 230 can be formed using additive manufacturing and/or any other method for flow path hardware manufacturing.

Figure 10:
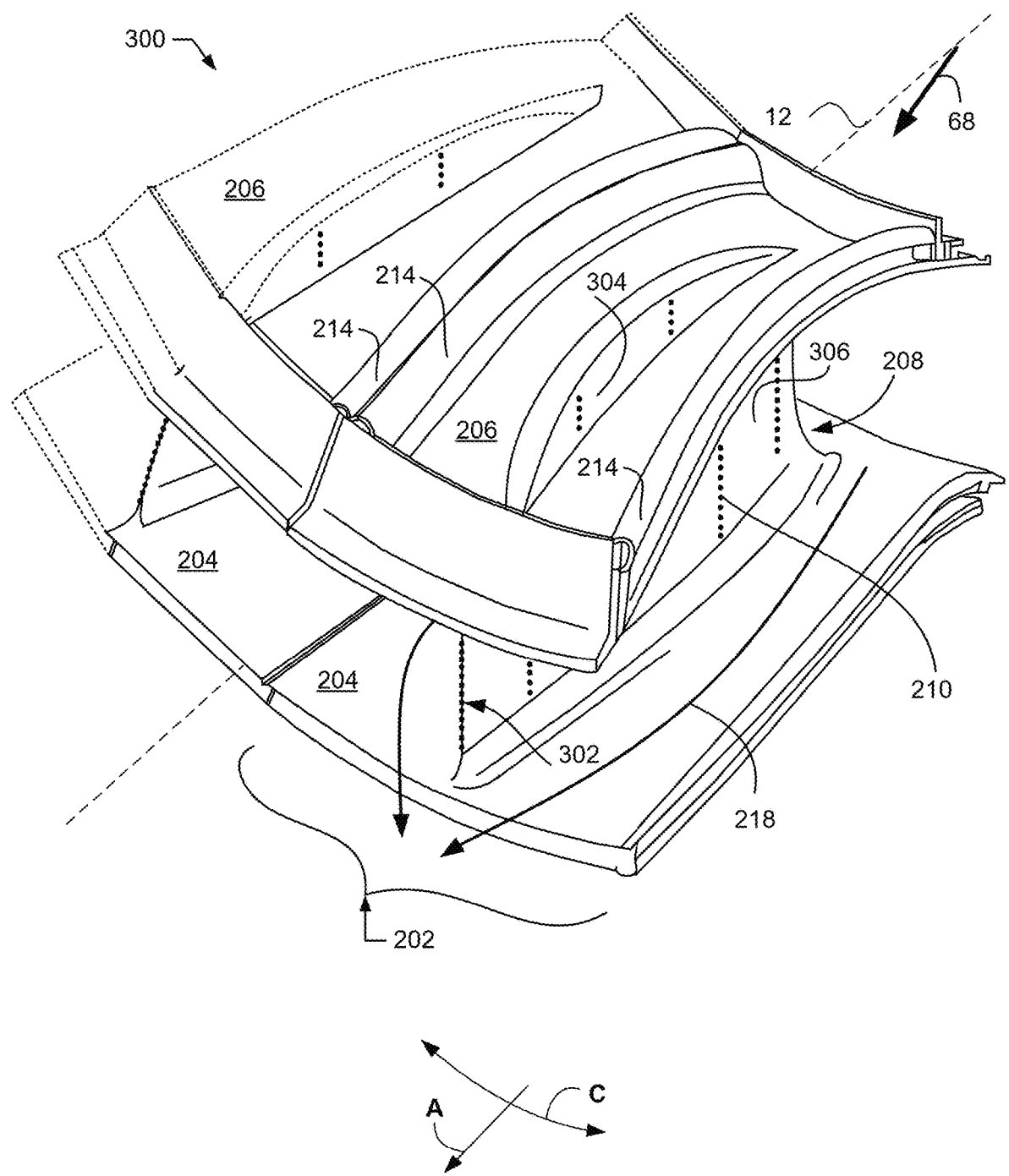
FIG. 10 illustrates an example lower perspective view of a partial turbine fairing assembly that can be utilized within the example gas turbine engine of FIG. 1.

FIG. 10 illustrates an example lower perspective view 300 of a partial turbine fairing assembly 200 that can be utilized within the gas turbine engine of FIG. 1. The lower perspective view 300 illustrates hot air flow as it passes the outer edges of the vane(s) 208, with the vane(s) 208 narrowing along the centerline axis 12. In the fairing assembly 200 of FIG. 10, the outer band 204 and inner band 206 of the fairing 202 are shown in alternate view from those of FIG. 9, with the inner band 206 shown in more detail. The hot air flow 218 originating from the HP turbine 28 once the combustion gases 68 pass through a combustor is shown passing from the leading edge to the trailing edge of the vane(s) 208 of FIG. 9. As in FIG. 9, the vane openings 210 are shown positioned circumferentially around the vane(s) 208, with the openings seen on an inside surface 304 and an outside surface 306 (e.g., a first surface 304 and a second surface 306) of the hollow double-walled vane(s) 208.

Figure 11:
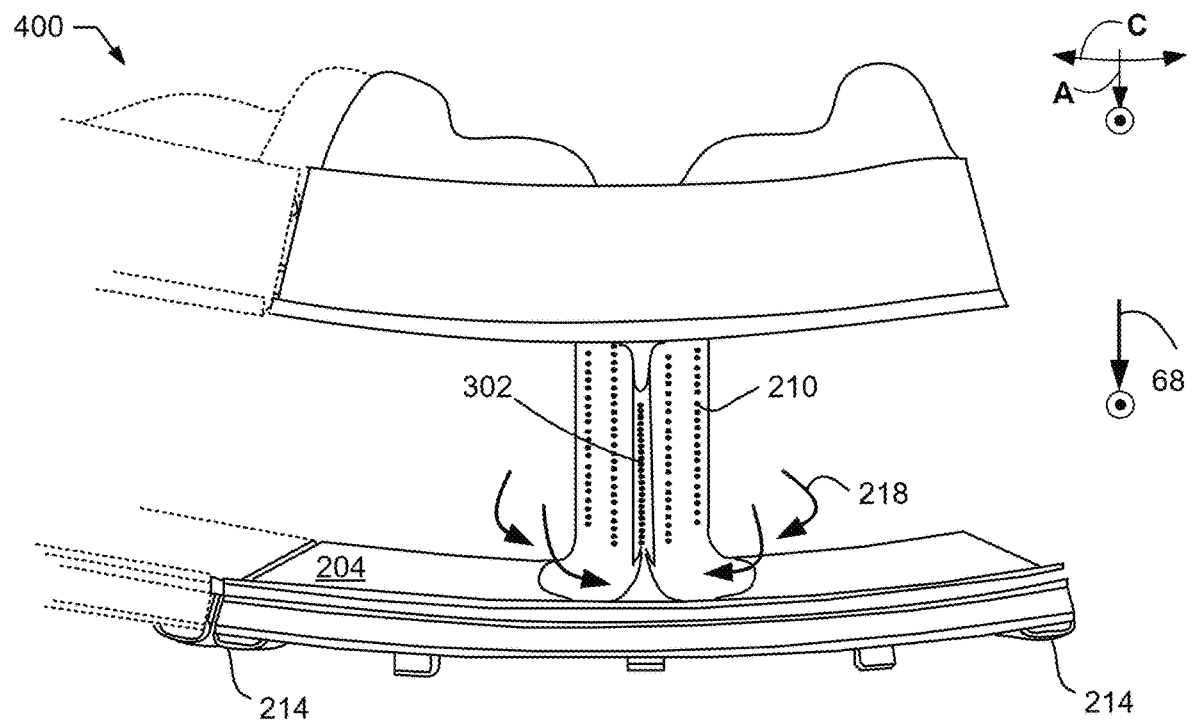
FIG. 11 illustrates an example side view of the lower perspective view of the partial turbine fairing assembly of FIG. 10.

In FIG. 10, the openings are also distinctly positioned on the trailing edge of the vane 208, forming a column of vertically aligned openings 302 on the very tip of the trailing edge of the vane 208 structure, as shown in more detail using an alternate view of FIG. 11. The trailing edge aligned vertical openings 302 can be used to provide additional cooling to the fairing 202, such that there is an evenly distributed flow of cool air throughout the fairing 202, resulting in a reduction of thermal gradients. For example, temperature gradients can occur over very short distances, producing high thermal stresses and changing the overall dimensions of the turbine frame structures and flow path hardware (e.g., fairing, strut, etc.), such that the structures can expand and/or contract in response to the changes in temperature (e.g., thermal-induced growth of the fairing materials can occur as they reach normal operating temperature, with temperatures reaching over 1000 degrees Celsius in the combustor and turbine sections). Therefore, design of the fairing structure is to consider not only performance criteria (e.g., strength, fatigue capability, etc.), but also overall cost as well as weight (e.g., in aerospace applications). Fairing 202 material selection can depend on factors that allow for control of thermal expansion (e.g., thermally-induced material expansion) for improved engine 10 performance (e.g., low coefficient of thermal expansion). However, such conditions are restrictive to fairing 202 material selection. Cooling of the fairing(s) 202, as disclosed herein, can allow use of lower grade materials that are otherwise not applicable due to the high temperatures and/or presence of thermal gradient formation in the turbine frame. Moreover, use of higher-grade materials for the fairing assembly 200 that already withstand high operating temperatures can permit operation at even higher temperatures in the presence of a flow path hardware-based cooling system (e.g., cooling of fairing(s) 202). Additionally, the edges 214 used to form the seal between each of the adjacent fairing(s) 202 can be designed to further reduce thermal gradients and account for thermal-induced expansion at operating temperatures, as described in more detail in association with FIGS. 19A-19D.

FIG. 11 illustrates an example side view 400 of the lower perspective view 300 of the partial turbine fairing assembly of FIG. 10. The side view 400 of FIG. 10 indicates that the hot air flow 218 originating from the HP turbine 128 passes from the forward end of the outer band 204 to the aft end of the outer band 204 of the fairing 202 of FIGS. 9-10, with the direction of the flow of combustion gases 68 indicating the positioning of the partial fairing assembly side view 400 of FIG. 11. Curved edges 214 of the outer band 204 are shown adjacent to another fairing, thereby forming a partial fairing assembly 200. The column of vertically aligned openings 302 of FIG. 10 of the vane 208 of FIGS. 9-10 is shown in FIG. 11 to be positioned on the tip of the trailing edge of the vane 208. This provides an alternate view of the openings 210 included on the outer surface 306 of the vane 208 to illustrate where cooling air from the outer band 204 entering the hollow vane 208 can exit in order to cool the fairing 202. The column of openings 302 can be excluded from the vane 208 design, instead including only the remaining openings 210 shown to be circumferentially surrounding the vane 208. In some examples, only the column of openings 302 on the trailing edge of the vane 208 can be included as part of the fairing cooling system design. A total number of openings used in the column of vertically aligned openings 302 and/or the remaining columns of openings 210 can be determined based on a bulk temperature reduction of the fairing assembly 200. The openings 210 and/or 302 may be arranged in any other way and/or positioned in any part of the vane in a symmetrical or asymmetrical manner and are not limited to a specific arrangement.

Figure 12:
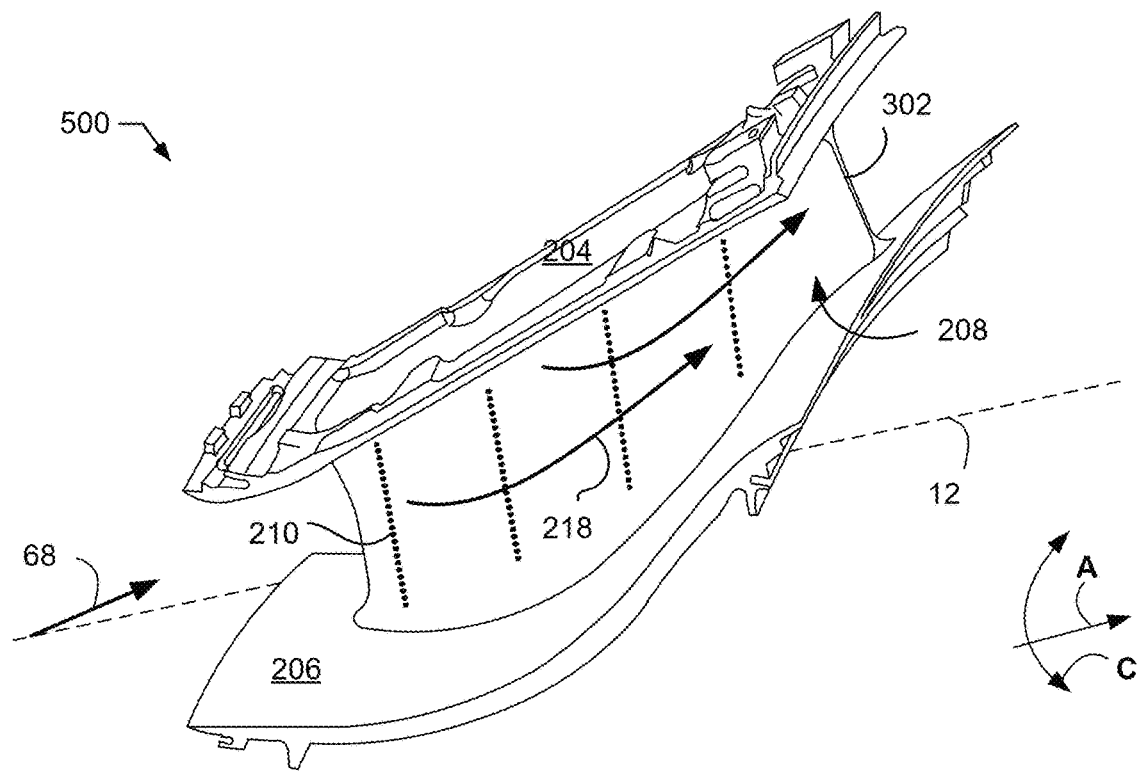
FIG. 12 illustrates an example side view of the upper perspective view of the partial turbine fairing assembly of FIG. 9.

FIG. 12 illustrates a side view 500 of the upper perspective view of the partial turbine fairing assembly 200 of FIG. 9. The side view 500 of the fairing assembly 200 provides a view of the openings 210 as positioned on the outside surface 306 of the vane 208, such that the number of openings 210 can be adjusted to account for the narrowing of the outside surface 306 along the centerline axis 12. The outer band 204 and the inner band 206 are positioned between the vane 208. Openings 210 and/or 302 permit cooling air flow to enter the fairing airfoil from the outer band 204 via the openings where hot air flow 218 from the HP turbine 28 is passing through the fairing 202, as previously described. In FIG. 12, the vane openings 210 positioned circumferentially around the vane 208 are arranged in a total of four columns on each side of the outer surface 306 of the vane wall, with a single column of openings 302 on the trailing edge of the airfoil. However, any number of columns and/or arrangement of the openings on the outer surface 306 of the vane 208 can be used, based on the final intended bulk temperature reduction. The geometry of the openings 210 and/or 302 can be any geometry determined to improve fairing cooling performance, such as reduction of hot mainstream ingestion (e.g., laterally-and-forward expanded holes, flared holes, variation of length-to-dimeter ratio of the holes, etc.). The spacing of the openings 210 and/or 302 can be of any spacing (e.g., small hole spacing can result in better coverage of the vane 208, with higher effectiveness values compared to larger holes).

Figure 13:
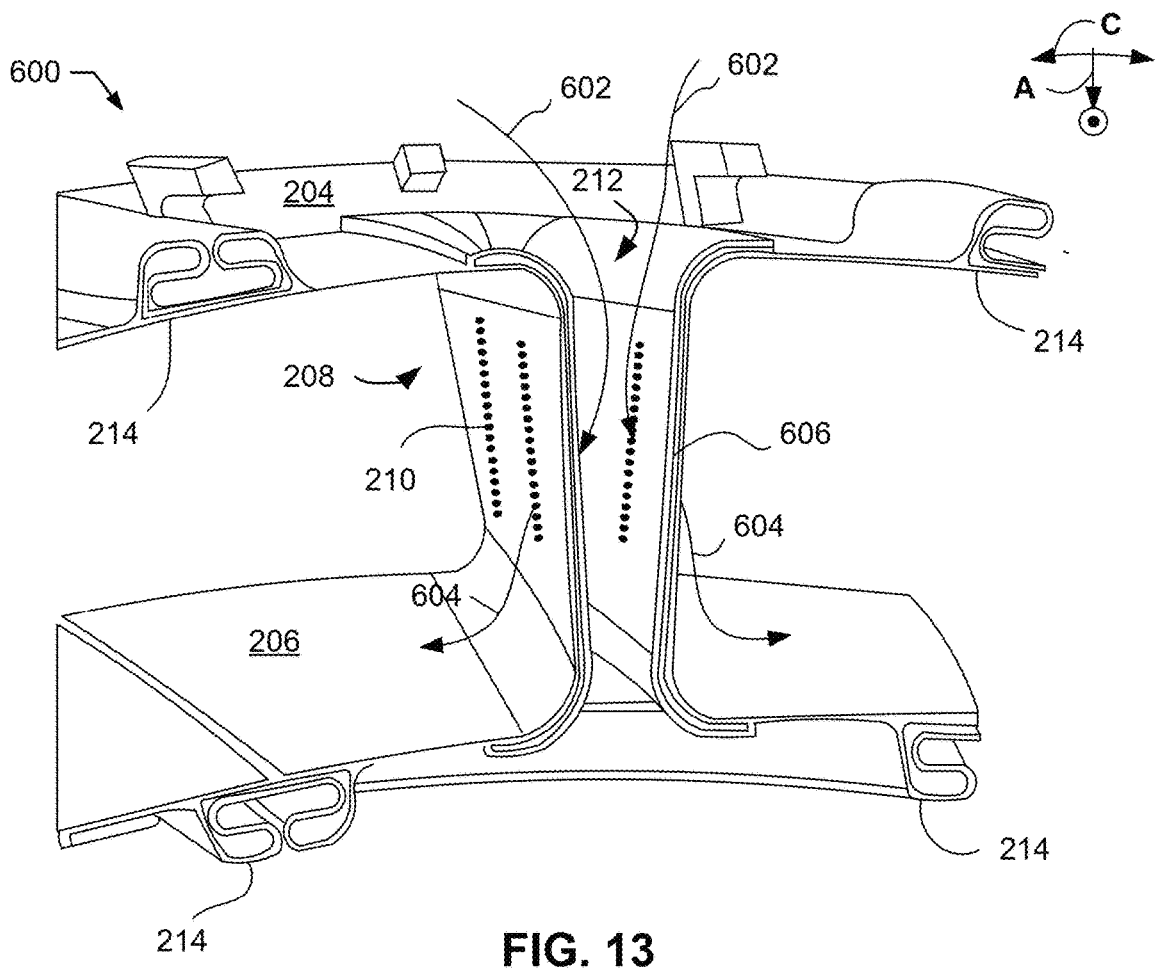
FIG. 13 illustrates an example cross-sectional double-walled fairing view of the upper perspective view of the partial turbine fairing assembly of FIG. 9.

FIG. 13 illustrates a cross-sectional double-walled fairing view 600 of the upper perspective view of the partial turbine fairing assembly 200 of FIG. 9. The vane 208 is shown connecting the outer band 204 to the inner band 206, with fairings 202 of the partial fairing assembly 200 attached at the curved edges 214. A cooling air flow 602 from the outer band 204 (indicated by arrows in FIG. 13) enters the hollow structure 212 of the vane 208. The cooling air flow 602 is shown entering the inside vane surface 304 where openings 210 are located to create an air flow 604 conduit between the double-walled vane 208 and the fairing 202 airfoil (as shown by arrows in FIG. 13), such that the cooling air 604 passes through the double-walled vane 208, exiting at the outer vane surface 306 through the openings 210. The cooling air flow 602 can originate from a source such as the compressor. Cooling air 604 exiting from the openings in the vane 208 creates a type of film cooling, resulting in a thin layer of cool air on the fairing airfoil surface. For example, cold air can be injected into the hot gas flow through the vane openings 210, protecting the fairing airfoil metal by cooling its surface. Furthermore, given the double-walled structure of the vane 208, the cooling air 602 enters the double-wall 606 through the inner vane wall surface 304 (FIG. 10) openings and dissipates throughout the double-wall 606 structure, in addition to exiting through the openings 210 on the outer vane surface 306. This permits the vane 208 walls to be cooled in addition to the wall openings 210 providing additional film cooling through the cool air exiting directly out of the vane openings 210. As such, the high temperatures to which the fairing assembly 200 materials are exposed can be reduced (e.g., bulk temperature reduction) and the materials better protected (e.g., reducing high temperature-induced material changes).

Figure 14:
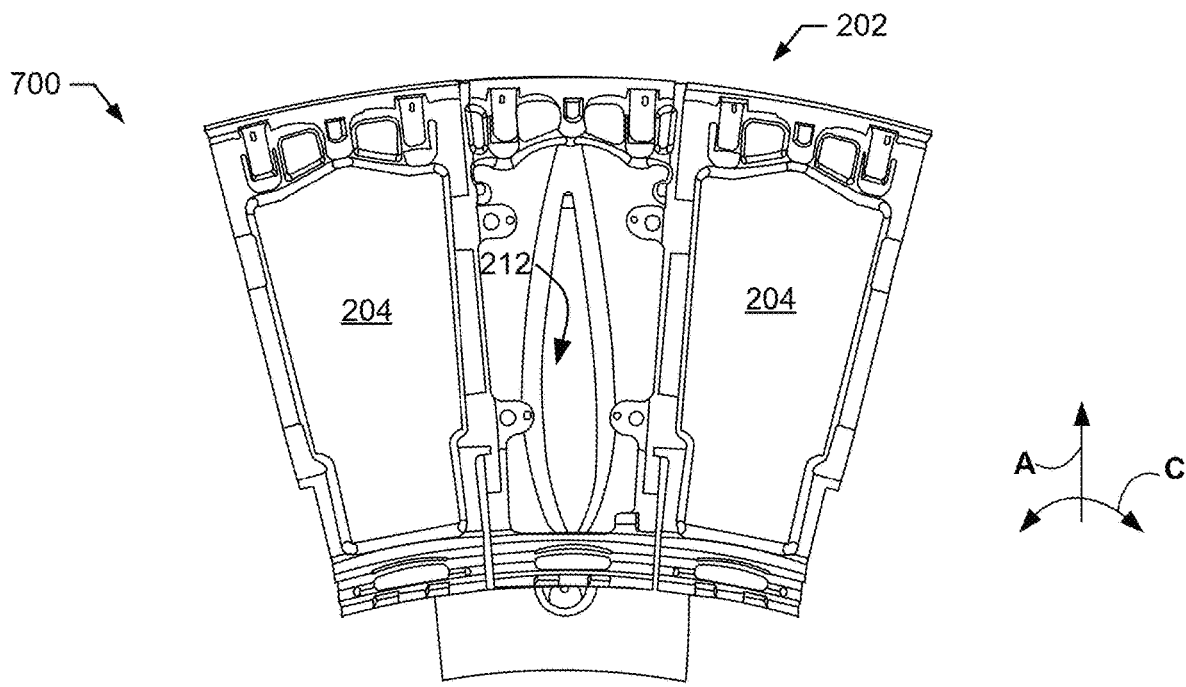
FIG. 14 illustrates a top view of the upper perspective view of the partial turbine fairing assembly of FIG. 9.

FIG. 14 illustrates a top view 700 of the upper perspective view of the partial turbine fairing assembly 200 of FIG. 9. FIG. 14 shows the outer band 204 of the fairing 202, with the hollow interior 212 of the vane 208. FIG. 14 is used to illustrate fairing cooling air flow at the leading edge and trailing edge of the fairing airfoil, as described in more detail below in association with FIGS. 15A-15C and FIGS. 17A-17B.

Figure 15A:
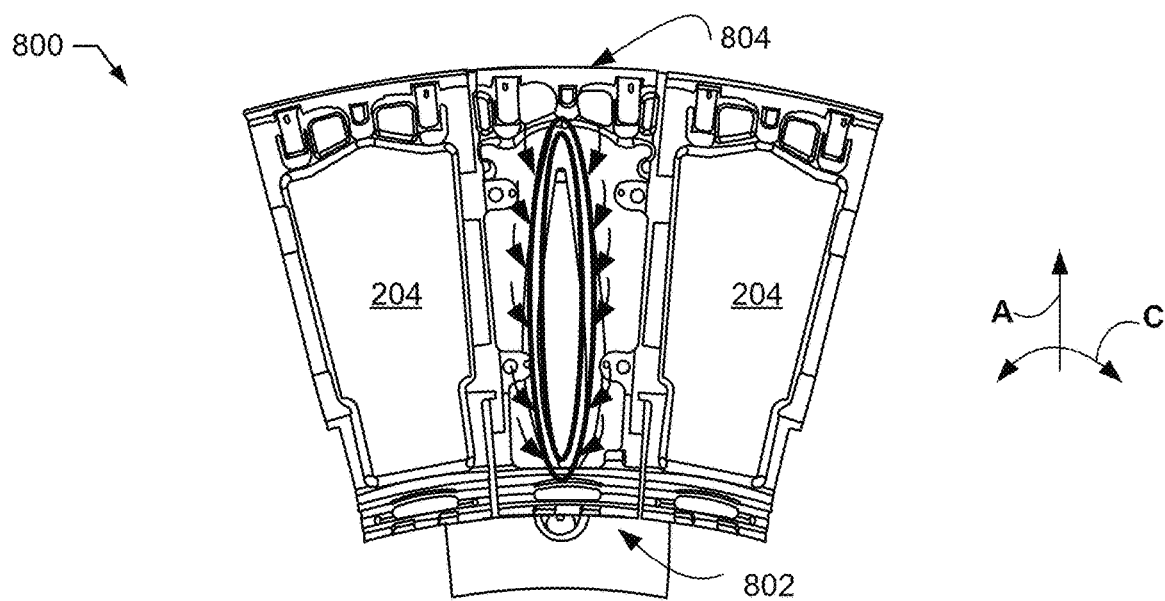
FIG. 15A illustrates fairing cooling using air flow from an outer band cavity of the partial turbine fairing assembly of FIG. 9.
Figure 15B:
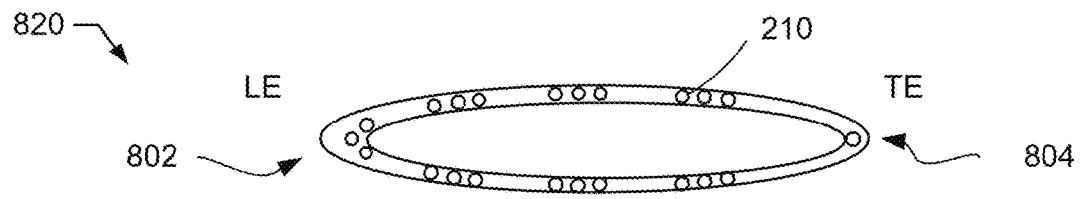
FIG. 15B illustrates positioning of flow path openings in the fairing of FIG. 15A to allow entry of cooling air flow into the double-walled frame fairing of FIG. 13.
Figure 15C:
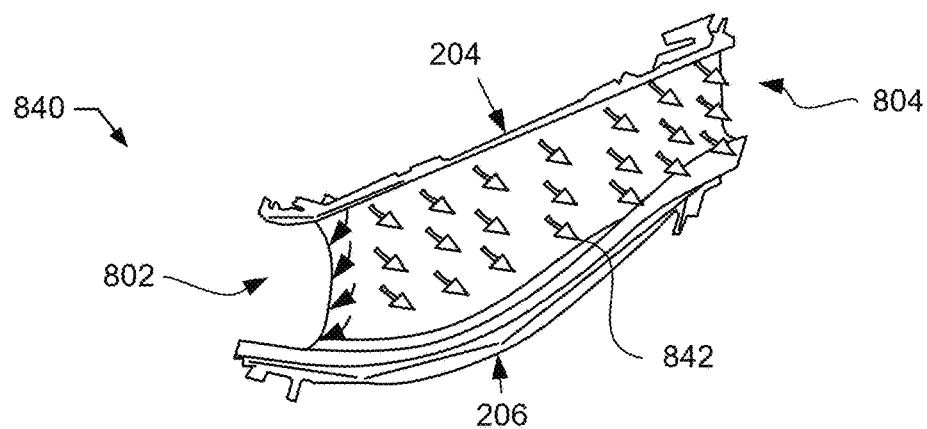
FIG. 15C illustrates release of cooling air flow from flow path side openings of the double-walled fairing of FIG. 13.

FIGS. 15A-15C depict example fairing cooling 800 using flow path openings in the double-walled vane 208 of the fairing assembly 200 of FIG. 9. FIG. 15A illustrates fairing cooling 800 using air flow from an outer band cavity of the partial turbine fairing assembly 200. In FIG. 15A, the outer band 204 is shown surrounding the hollow opening of the vane 208, with a leading edge 802 and a trailing edge 804 indicating the position of the fairing airfoil with respect to the flow of hot air originating from the HP turbine 28 of FIG. 1. As such, the arrows illustrated in FIG. 15A correspond to the entry of cooling airflow (e.g., originating from a compressor) from the outer band 204 to the hollow, double-walled vane 208.

FIG. 15B further illustrates positioning 820 of flow path openings in the fairing of FIG. 15A to allow entry of cooling air flow into the double-walled frame fairing of FIG. 13. Openings 210 are embedded within the double-walled vane 208, with openings located throughout the entire circumference of the vane 208, including at the leading edge (LE) 802 and/or the trailing edge (TE) 804 (e.g., column of openings 302 of FIG. 10). For example, the inner ellipse corresponds to the inner vane wall surface 304 (e.g., exposed to cooling air flow from a bore) while the outer ellipse corresponds to the outer vane wall surface 306 (e.g., exposed to hot air flow from HP turbine 28). As such, the example arrangement of the openings 210 allowing cooling air to enter the double-walled vane 208 (e.g., at the inner vane wall surface 304) from the outer band 204 cavity permits the cooling air to then be released from the side openings of the outer vane surface 306 to the hot air flow path surrounding the fairing airfoil.

FIG. 15C illustrates release 840 of cooling air flow from flow path side openings of the double-walled fairing of FIG. 13. The leading edge 802 and the trailing edge 804 are shown relative to the outer band 204 and the inner band 206. The cooling airflow 842 is shown exiting the outer vane surface 306 at the openings 210, in addition to openings located on the leading edge 802 and/or the trailing edge 804. As such, the cooling airflow 842 exits at all sides of the outer vane surface 306, promoting the cooling of the fairing airfoil and reducing the bulk temperature. The outer band 204 can provide a cooling air flow pressure of 48-145 psia, while the hot air flow pressure at the fairing airfoil can be at 46-138 psi. In some examples, the vane opening 210 diameter can be 0.015-0.045 inches, with a total of 35-105 openings (e.g., holes) positioned throughout the vane (e.g., outer vane surface and/or inner vane surface). Using these parameters, when the cooling flow is at 0.012-0.038% W25 (e.g., W25 corresponding to the physical core airflow at the core inlet), with a 1B 12 strut at 0.15-0.45% W25, the total bulk temperature reduction can be 75-225 degrees Fahrenheit. Therefore, better temperature control is achieved through the presence of the openings 210, reducing thermal stresses and keeping a low temperature gradient in order to avoid fatigue of fairing materials and other flow path hardware components (e.g., maintaining an even temperature distribution and avoiding heat-induced material deformation/expansion).

Figure 16:
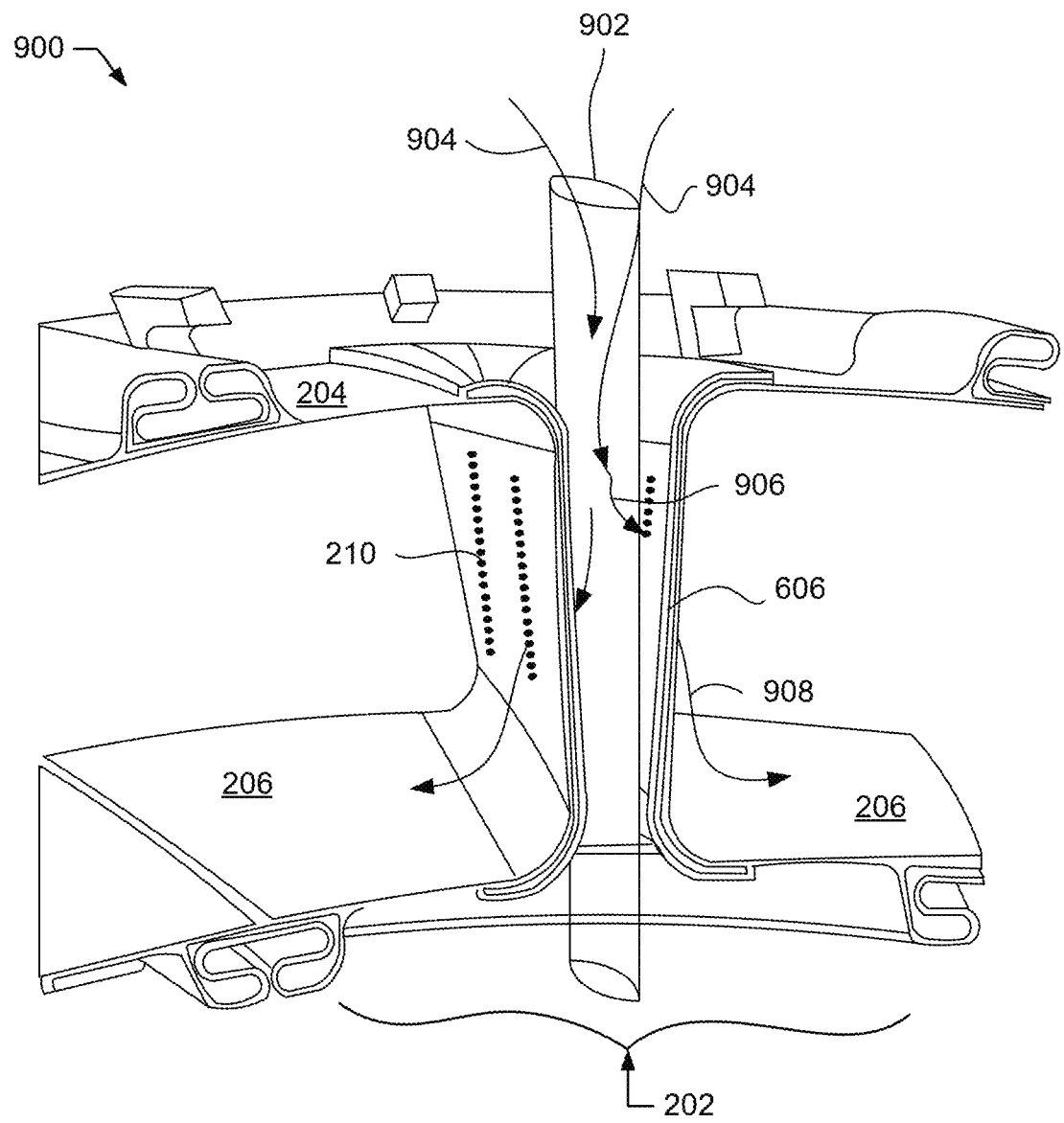
FIG. 16 illustrates an example cross-sectional double-walled fairing view of the upper perspective view of the partial turbine fairing assembly of FIG. 9, including a strut positioned within the fairing.

FIG. 16 illustrates a cross-sectional double-walled fairing view 900 of the upper perspective view of the partial turbine fairing assembly 200 of FIG. 9, including a strut positioned within the fairing. In FIG. 16, a metallic strut 902 extends through the hollow interior of the fairing vane (e.g., passing through the outer band 204 to the inner band 206). The strut 902 transfers load from the fairing assembly 202 hub and can be solid, hollow, or partially hollow. In FIG. 16, the strut 902 is hollow, providing cooling air flow 904 to the fairing airfoil through the opening(s) 210 of the fairing double-walls 606. The fairing hollow structure 212 protects the strut 902 from hot gases. The fairing 202 can be formed using materials that have a low coefficient of thermal expansion (e.g., ceramic matrix composite (CMC)-based material, etc.), such that the rate of thermal expansion of the fairing can be different from that of the metal strut 902 (e.g., formed using nickel-based alloys, etc.). In FIG. 16, the cooling air flow 904 moving through the strut 902 can exit the strut 902 and enter the double-walled vane 208, providing air flow 906 to the inner vane surface 304 and filling the double-wall with cooling air and/or further providing cooling air flow 908 that exits the outer vane surface 306 at openings 210. The strut 902 also has openings (e.g., holes) at its top sides to release air to pressurize the outer band 204 cavity. As such, cooling air can be drawn by the strut 902 from the outer band 204 cavity via holes available on the strut surface, with additional holes provided towards the middle of the strut 902 to release cooling air for passage to the fairing (e.g., via openings 210), as described in more detail in connection with FIG. 17B. For example, the strut can include a strut baffle pieced with impingement cooling holes, providing impingement cooling of the fairing 202, described in connection with FIGS. 17B and 18. Cooling air from a source such as a compressor can be fed through the strut 902, with a portion of the air passing all the way through the strut, and a portion of the air entering the double-walled vane 208. The air can exit the struts through passages on the strut 902 sides and enter the strut baffles. A portion of the flow then exits impingement cooling openings in the strut baffle to be used for impingement cooling of the fairing 202. In some examples, air from the outer band 204 cavity can be a combination of purge air and post-impingement air flow.

Figure 17A:
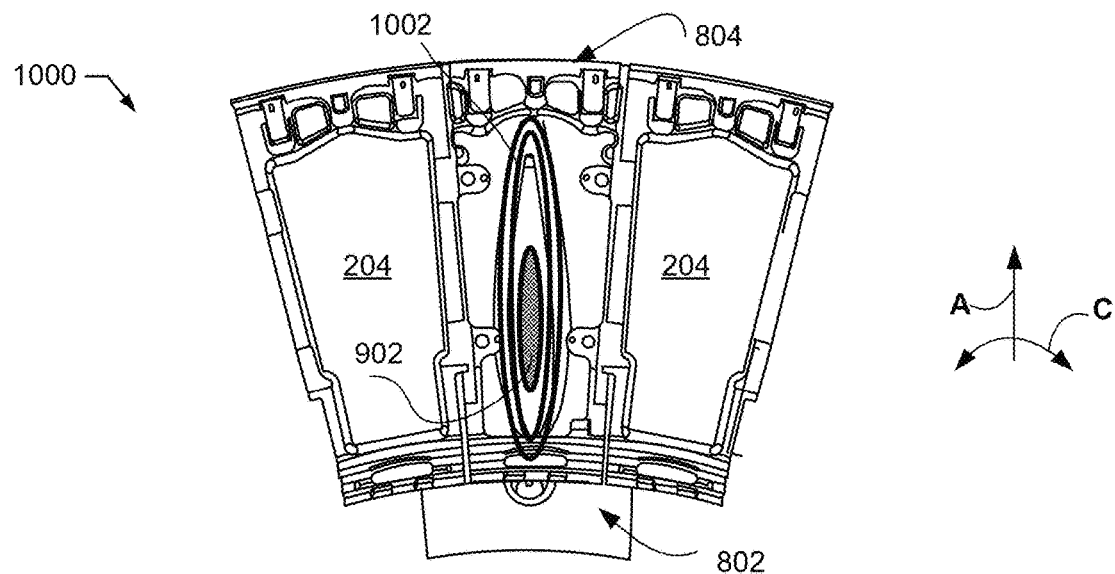
FIG. 17A illustrates a fairing cooling configuration using air flow from the strut positioned within the fairing of FIG. 16.

FIG. 17A illustrates an example configuration for fairing cooling 1000 using air flow from the strut positioned within the fairing 202 of FIG. 16. In FIG. 17A, an upper view of the strut 902 is shown positioned at the outer band 204, with the leading edge 802 and the trailing edge 804 positioned at the forward end of the fairing 202 and the aft end of the fairing 202, respectively, with an outline 1002 of the double-walled vane 208 shown for reference in connection with the cooling air flow description associated with FIG. 17B.

Figure 17B:
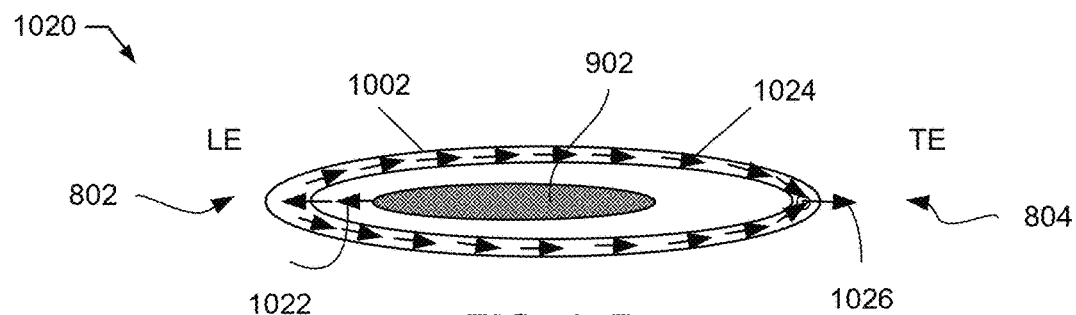
FIG. 17B illustrates cooling flow entering the double-walled fairing from the strut positioned within the fairing of FIG. 16.

FIG. 17B illustrates an example cooling flow 1020 entering the double-walled fairing 202 from the strut 902 (e.g., shown as a top view of the strut in FIG. 17B) positioned within the fairing 202 of FIG. 16. In FIG. 17B, a cooling air flow 1022 enters the double-wall 606 of the fairing at the inner vane surface 304 from a hole located at the strut 902 outer surface, as shown by example air flow 1022 exiting the strut surface and entering the double-wall 606 at the leading edge 802 of the fairing airfoil. Based on a pressure provided, the air flow 1024 can travel from the leading edge 802 to the trailing edge 804 of the double-wall 606, providing a cooling air flow 1026 that exits the double-wall 606 at the trailing edge 804 via the column of aligned vertical openings 302 of FIG. 10. For example, the air flow pressure inside the strut 902 can be at 62-186 pounds per square inch absolute (psia), and the flow path at the fairing 202 airfoil can be at 46-138 psia. If the strut hole diameter (e.g., hole where air flow 1022 exits the strut) is 0.25-0.75 inches, with a fairing opening 210 diameter of 0.015-0.045 inches, a total opening 210 count of 15-45, a cooling flow of 0.15-0.45% W25, with a 1B 12 strut at 0.15-0.45% W25, the total bulk temperature reduction can be at 100-300 degrees Fahrenheit. As such, parameters such as the opening 210 diameter, the opening 210 count, and strut 902 hole diameter, which releases the cooling air into the double-wall 606, can be modified and/or varied to achieve a specific bulk temperature reduction based on given air flow pressures.

Figure 18:
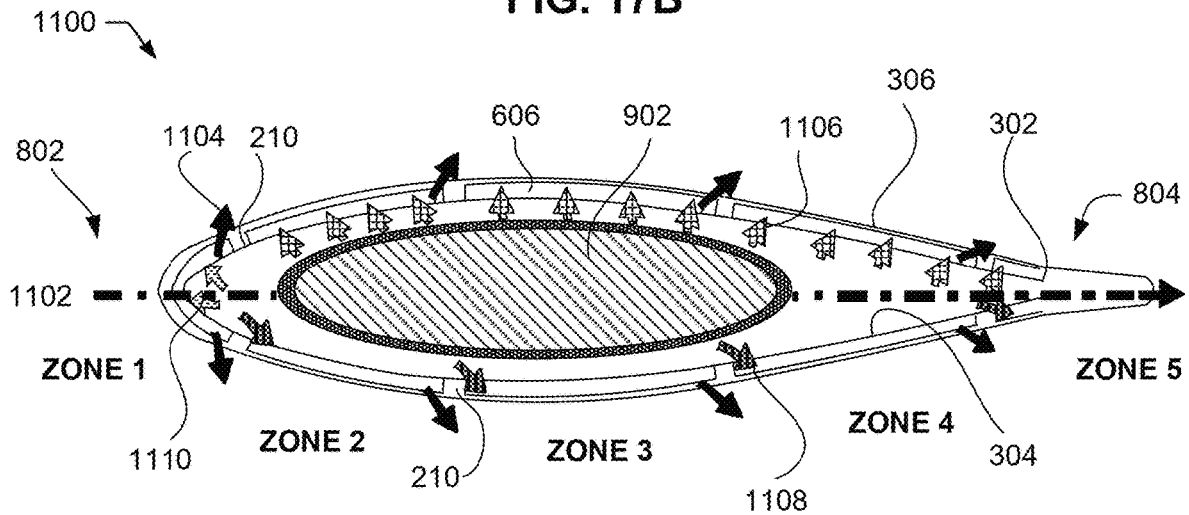
FIG. 18 illustrates flow of cooling air used to cool the fairing of FIG. 16, including impingement cooling, bore cooling, and/or film cooling.

FIG. 18 illustrates a flow 1100 of cooling air used to cool the fairing of FIG. 16, including impingement cooling, bore cooling, and/or film cooling. The flow 1100 of cooling air allows for use of multiple cooling flow paths to reduce high operating temperatures present in the fairing assembly 200 during engine operation. As previously described, film cooling occurs when the cooling air exiting from the openings in the vane 208 results in a thin layer of cool air on the fairing airfoil surface. For example, cold air can be injected into the hot gas flow through the vane openings 210, protecting the fairing airfoil metal by cooling its surface. In FIG. 18, the hotter high pressure turbine-derived air enters the fairing at the leading edge 802 of the fairing airfoil (e.g., air-foil shaped vane 208), undergoes cooling as a result of the cooling process described herein, and exits or leaves at the trailing edge 804. In FIG. 18, the strut 902 is positioned within the fairing (e.g., hollow structure of vane 208).

For ease of reference, FIG. 18 is subdivided into cooling zones (e.g., zones 1-5) along the axis 1102, with zone 1 at the leading edge 802 and zone 5 at the trailing edge 804 of the fairing airfoil. Cooling of the fairing in zone 1 includes an impingement cooling air flow 1110 at the leading edge 802, as described in connection with FIG. 17B (e.g., the cooling air flow 1022 originating from the strut 902 hole). The impingement cooling flow 1110 is used at the leading edge 802, given that this is the hottest region in the fairing 202 (e.g., hot air flow originating from HP turbine 28 of FIG. 1). Likewise, the hot air flow path 218 at the leading edge 802 has a high pressure, such that cooling air flow with a lower air pressure is not released. Unlike film cooling, also present in zone 1 as a result of the cooling air flow 1104 exiting vane opening(s) 210 to cool the outer vane surface 306, impingement cooling is an internal type of cooling (e.g., cooling of the inner vane surface 304). Cooling of the inner vane surface 304 in addition to the outer vane surface 306 reduces the bulk temperature of the fairing assembly 200 by improving cooling air circulation, thereby lowering temperatures at the vane surfaces in contact with flow of hot combustion gases 68.

In FIG. 18, the cooling air used to cool the fairing 202 of FIG. 9 can originate from a compressor. The cooling air also can originate from a bore tube assembly (e.g., bore cooling) that supplies cooling steam to the hot gas components and returns the spent cooling steam (e.g., recycling the cooling air). Therefore, zone 1 can include the impingement cooling flow 1110, a film cooling flow 1104, and/or a bore cooling flow 1108, while zones 2-5 can include the film cooling flow 1104, the bore cooling flow 1108, and/or an impingement baffle-based cooling flow 1106. In zones 2-5, the cooling air flow 1108 from the outer band 204 and/or the strut 902 can enter the double-wall 606 of the vane, providing cooling within the double-wall 606 while also allowing for the cooling air to exit through openings 210 (e.g., the film cooling flow 1104). Zones 2-5 also include the impingement baffle-based cooling flow 1106. For example, the strut 902 can include a strut baffle pieced with impingement cooling holes, providing impingement cooling of the fairing 202. Cooling air from a source such as a compressor (e.g., the HP compressor 22) can be fed through the strut 902, with a portion of the air passing all the way through the strut 902, and a portion of the air entering the double-wall 606. The air can exit the struts 902 through passages on the strut 902 sides and enter the strut baffles. A portion of the flow then exits impingement cooling openings in the strut baffle to be used for impingement baffle-based cooling flow 1106. The impingement baffle-based cooling flow 1106 can enter the double-wall 606 to cool the fairing (e.g., backside cooling). In zone 5 at the tailing edge 804, a column of vertically oriented openings 302 of FIG. 10 can be included to permit cooling air flow release to the flow path along the fairing airfoil, in order to fill any flow wakes (e.g., regions of disturbed flow downstream of the airfoil trailing edges) and reduce aerodynamic loss (e.g., maintain turbine aerodynamic efficiency despite reduction of fairing assembly 200 vane surface temperatures).

The cooling zones (e.g., zones 1-5 of FIG. 18) disclosed and described herein are intended as examples and do not limit application to the cooling zone(s) and/or cooling methods (e.g., impingement cooling, film cooling, etc.) disclosed and described herein. The methods and apparatus disclosed herein for gas turbine frame flow path hardware cooling can be changed based on the design of the frame components (e.g., vane opening diameters, layout, and/or size, etc.) and the cooling requirements of the hardware.

Figure 19A:
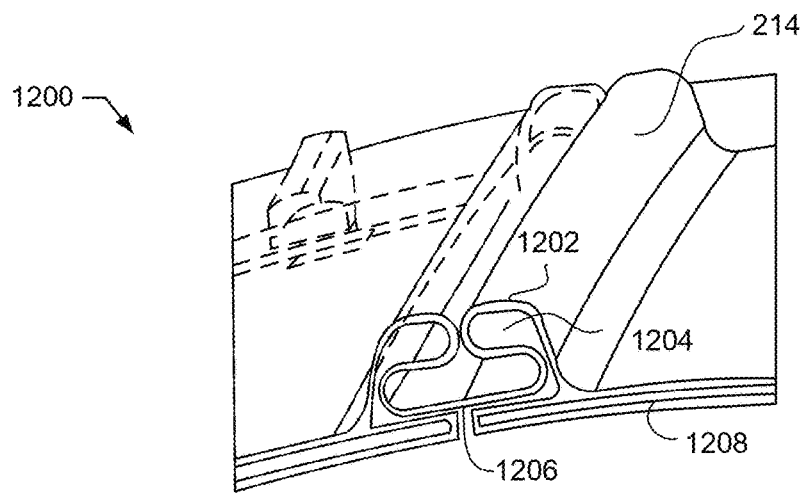
FIG. 19A illustrates end segments of a spring seal used to form seals in the illustrated turbine fairing assemblies of FIGS. 9-11, FIG. 13, and FIG. 16.
Figure 19D:
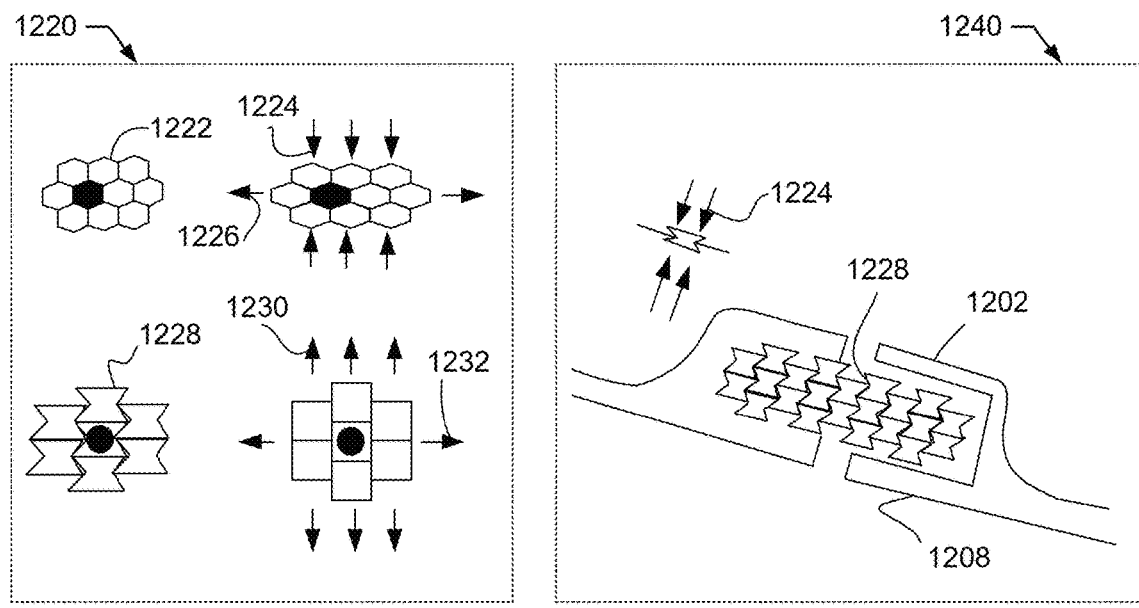
FIG. 19D illustrates variations of the spring seal hair pin structure for use in fairing assembly seals.
Figure 19D:
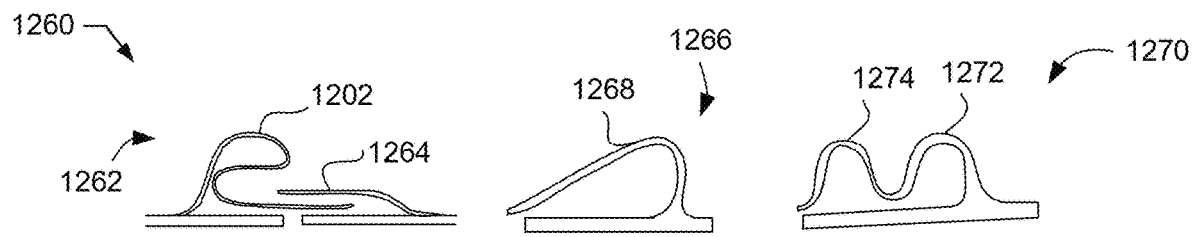

FIG. 19A illustrates end segments of a spring seal 1200 used to form seals in the illustrated turbine fairing assemblies 200 of FIGS. 9-11, FIG. 13, and FIG. 16. The example seal 1200 structure used as part of the single-piece fairing 202 of FIG. 9 can include curved edges 214, shaped to form an example hairpin-like structure 1202 (also referred to herein as a hairpin shape or a hairpin-like curved structure, as described in more detail in connection with FIG. 19D), with the curved edges 214 forming a uniform seal along example seal ligament 1206, such that the seal hairpin-like structure 1200 edges blend together with the rest of the fairing 202 structure. The hairpin-like structure 1202 can have a hollow interior 1204 (e.g., for fairing weight reduction). For example, the hairpin-like structure 1202 includes an acute inner angle (e.g., formed by bringing two edges of material close together to form an upper region with an oval and/or elongated shape formed as a result of a 180-360 degree bend of the hairpin-like structure material). The seal 1200 of FIG. 19 is designed to be integrated into the fairing surface 1208 and to interface with other fairings to form a full fairing assembly 200 extends circumferentially about the engine centerline axis (e.g., axis 12 of FIG. 1). The seal 1200 can be designed to reduce and/or eliminate any gaps between adjacent fairings. Such gaps can cause leakage of fluid flowing over the fairings (e.g., leakage of bypass airflow), causing reduced engine performance. Furthermore, it is desirable to form seals that are able to withstand high stress loads applied on the fairings.

FIG. 19B illustrates an example structural arrangement 1220 of an example auxetic material 1228 that can be used as part of the seal structure of FIG. 19A. An auxetic material has a negative Poisson's Ratio (PR) (e.g., negative of the ratio of transverse/lateral strain to axial/longitudinal strain under axial loading conditions). A majority of materials have a positive PR, such that materials compressed along an axis expand in directions transverse to the applied axial load, while contracting along the axis when a tensile load is applied along an axis transverse to the axis of contraction. In FIG. 19B, a regular material 1222 with a positive PR contracts 1224 along the transverse direction when a tensile load or deflection 1226 is applied in an axial direction. An auxetic material (e.g., metallic foam) having a negative PR contracts/expands in the transverse direction when compressed/stretched in the axial direction. In FIG. 19B, an auxetic material 1228 stretched along axial direction 1232 expands along transverse direction 1230. In some examples, the auxetic material can be embedded within a host matrix. Additionally, the auxetic material 1228 can have repeating patterns (e.g., 3D-geometry void or slot features) that can be engineered to exhibit a specific negative PR behavior and desired stress performance (e.g., load damping) and thermal cooling (e.g., heat damping).

As illustrated in FIG. 19A, the hairpin shape 1202 can be formed as a fraction of a cell of the auxetic material 1228 from FIG. 19B. FIG. 19C illustrates use 1240 of the auxetic material 1228 of FIG. 19B as part of the seal 1200 structure of FIG. 19A. By incorporating the auxetic material 1228 into the seal 1200 that links the fairing edges together, the presence of any stretching 1226 that occurs as a result of material deformation (e.g., expansion) associated with high operating temperatures causes the seal 1200 to thicken as a result of the auxetic material 1228 behavior described in FIG. 19B. If compression occurs (e.g., a compressive force is applied), the auxetic material 1228 can contract in a lateral direction and will not be loaded from the hairpin shape 1202 transverse walls. The auxetic material 1228 can be incorporated into the seal as shown in FIG. 19C, such that the auxetic material 1228 is positioned between each of the hairpin-like structure(s) 1202 and is further encapsulated by the presence of the fairing surface 1208 (e.g., outer band 204 and/or inner band 206). While in FIGS. 19A-19C the seal 1200 is shown to have a hairpin-like curved structure 1202 such that the curved structure is symmetrical on both sides, the seal 1200 is not limited to this particular design and can be shaped into any other form, with some example seal structures 1260 shown in FIG. 19D.

FIG. 19D illustrates seal structure variations 1260 of the spring seal hairpin structure for use in fairing assembly seals. In FIG. 19D, the seal variations 1260 include a hairpin single-side seal 1262, an example single-wave seal structure 1266, and a double-wave seal structure 1270. The hairpin single-side seal 1262 includes a hairpin-like structure 1202 (e.g., having a hairpin shape) and a flattened seal structure 1264. The single-wave seal structure 1266 includes a single raised wave structure 1268, while the double-wave seal structure 1270 includes a first raised wave structure 1272 and an adjacent second raised wave structure 1274. A specific seal design 1200, 1262, 1266, and/or 1270 can be selected based on the structure that reduces the thermal gradient. A seal structure with more surface area (e.g., hairpin single-side seal 1262) can allow more area of the fairing surface to be exposed to compressed air flow. Furthermore, the selected spring seal design must be able to permit segmental fairing linkage to take on any circumferential load. The material selected for seal structure (e.g., hairpin seal, etc.) can be an alloy used as a single piece part with the fairing 202. For example, a rene alloy (e.g., Rene 41, Rene 80, Rene 95, Rene 108, Rene N5, etc.) and/or material (e.g., nickel-based alloy, Haynes alloy, TMS alloy, etc.) can be used for formation of the seal structure, as well as any such material that can be used in an additive manufacturing process.

Figure 20:
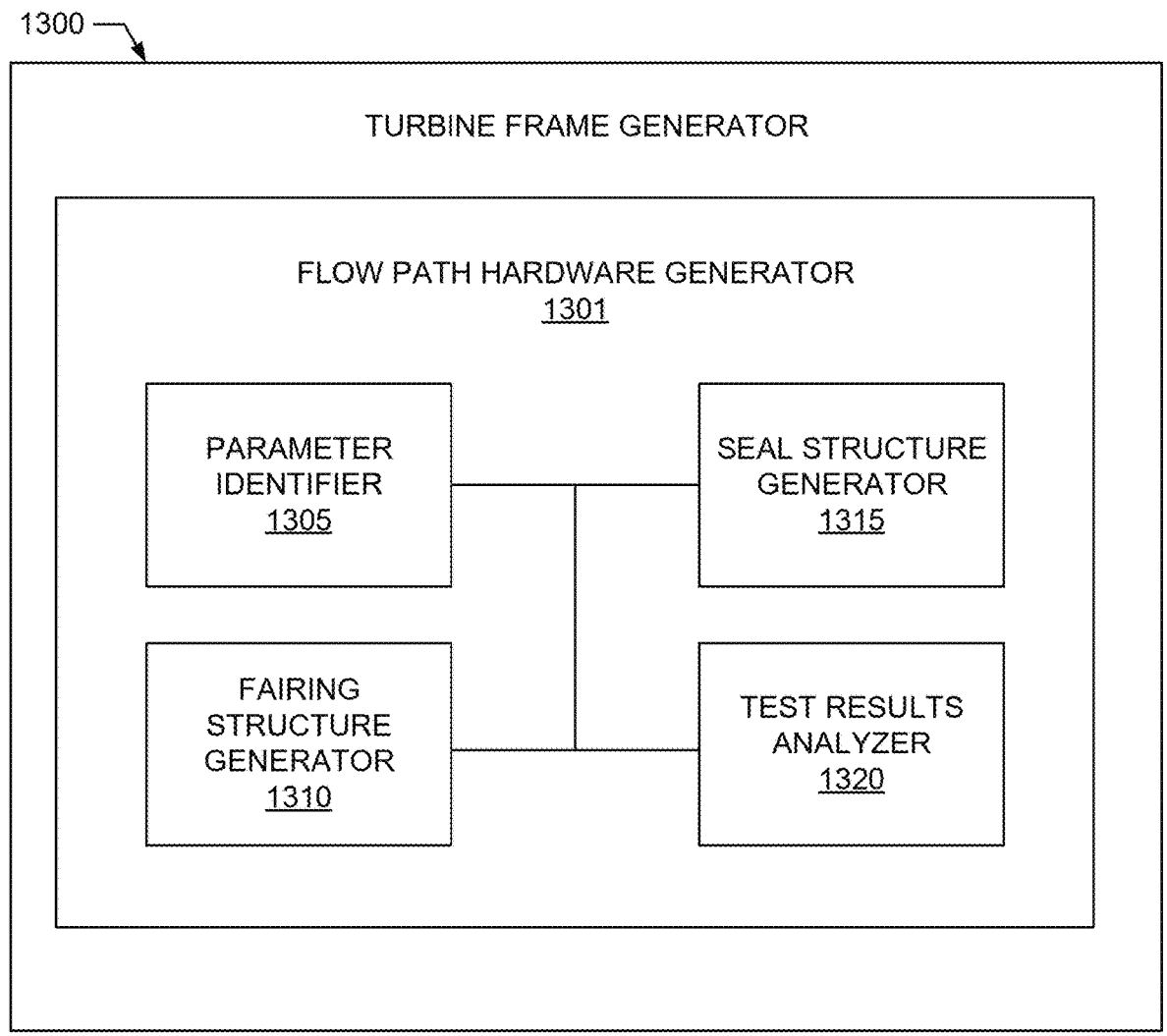
FIG. 20 is a block diagram of an example implementation of a turbine frame generator by which the examples disclosed herein can be implemented.

FIG. 20 is a block diagram of an example implementation of a turbine frame generator 1300. The turbine frame generator 1300 of FIG. 20 can include hardware, software, firmware, robots, machines, etc. structured to generate the example turbine fairing assembly 200 of FIG. 9. The turbine frame generator 1300 can generate fairing design, test fairing designs, and/or generate the example fairing assembly 200 based on the generated and/or tested fairing design. As such, the example fairing assembly 200 can be designed, modeled, manufactured, and/or assembled using the example turbine frame generator 1300. The components of the fairing assembly 200 (e.g., vane 208, seal(s) 1200, etc.) can be designed, modeled, manufactured, and/or assembled using the flow path hardware generator 1301. The flow path hardware generator 1301 includes a parameter identifier 1305, a fairing structure generator 1310, a seal structure generator 1315, and a test results analyzer 1320.

The parameter identifier 1305 identifies parameters to create a fairing structure 202 and/or fairing seal 1200 design. Such parameters can include a type of material being selected for use (e.g., low-grade material versus high-grade material), an intended size of the fairing assembly 200 (e.g., based on the gas turbine engine 10 size), a size of the strut 902 to be positioned within the hollow structure 212 of the fairing vane 208, the expected flow path 218 air pressure originating from the HP turbine 28, the expected flow path 904 air pressure within the strut 902, etc. Furthermore, such parameters can be varied. However, other potential parameters to determine the fairing structure 202 and/or fairing seal 1200 design include the total stresses and thermal loads exerted on the flow path hardware components. The parameter identifier 1305 can retrieve such parameters from previously-fabricated fairing designs. The parameter identifier 1305 can also predict and/or identify the effect of a parameter variation on the final fairing 202 and/or seal 1200 structure design (e.g., higher temperatures can result in higher thermal gradients, causing the parameter identifier 1305 to indicate the maximum temperature thresholds that can be used for a specific fairing structure design).

The fairing structure generator 1310 can determine the fairing structure design and/or generate (e.g., model, manufacture, assemble, etc.) the fairing structure based on the design. In the examples disclosed herein, the fairing structure generator 1310 can form a single-piece fairing. However, the fairing structure generator 1310 can also form a segmented and/or spit fairing if the design is altered to include split and/or segmented features. The fairing structure generator 1310 determines the fairing lattice structure 230 to be used, such that the fairing structure generator 1310 can generate a single 360-degree fairing component with a double-layer wall lattice structure in between. The fairing structure generator 1310 incorporates the lattice structure into all of the fairing or a specific part of the fairing (e.g., outer band 204, inner band 206, double-wall 606, etc.). Additionally, the fairing structure generator 1310 determines a lattice structure area 232 layout (e.g., lattice structure orientation) based on increased rate of heat transfer, higher load carrying capacity, increased access to cooling flow, lower weight of the fairing structure, etc., as described in connection with FIG. 9. Furthermore, the fairing structure generator 1310 can determine the location, positioning, size, geometry, and/or arrangement of the openings 210 within the outer vane surface 304 and/or the inner vane surface 306, based on parameter values provided by the parameter identifier 1305. The fairing structure generator 1310 can further determine the fairing component (e.g., double-wall 606) thickness, spacing, and/or length.

The fairing structure generator 1310 can form the fairing structure using additive manufacturing techniques or processes. Such processes can include formation of successful layers of material(s) on each other to create layer-by-layer, three-dimensional component(s) (e.g., fusion of layers to form a monolithic component having a variation of integral sub-components, layer-additive processes, layer-subtractive processes, and/or hybrid processes, etc.). Potential additive manufacturing technique used herein can include, but are not limited to, fused deposition modeling (FDM), selective laser sintering (SLS), electron beam melting (EBM), laser net shape manufacturing (LNSM), direct metal deposition (DMD), direct selective laser melting (DSLM), etc. However, any other forms of manufacturing (additive manufacturing-based or otherwise) applicable for the formation of the flow path hardware parts disclosed herein are possible. Furthermore, the manufacturing processes used to form the flow path hardware components can include use of any suitable material and/or combination of materials, including, but not limited to, metal, ceramic, polymer, nickel alloys, chrome alloys, titanium, titanium alloys, aluminum, aluminum alloys, iron, iron alloys, stainless steel, etc.

The seal structure generator 1315 can be used to form the seal 1200, including the fairing edges 214, such that the fairing edges 214 are integrated into the rest of the fairing 202 structure and link the adjacent fairings 202 to form the fairing assembly 200. The seal structure generator 1315 can form a variety of seal designs (e.g., seal designs 1260) for testing to determine a design that provides reduced thermal gradients and/or increased stress tolerance. The seal structure generator 1315 can determine the auxetic material 1228 geometry for use within the seal 1200 for increased stress resistance and improved integration with the fairing structure 202 generated using the fairing structure generator 1310. In some examples, the seal structure generator 1315 can form the seal structure using additive manufacturing techniques or processes. Such processes can include formation of successful layers of material(s) on each other to create layer-by-layer, three-dimensional component(s) (e.g., fusion of layers to form a monolithic component having a variation of integral sub-components, layer-additive processes, layer-subtractive processes, and/or hybrid processes, etc.). Potential additive manufacturing technique used herein can include, but are not limited to, fused deposition modeling (FDM), selective laser sintering (SLS), electron beam melting (EBM), laser net shape manufacturing (LNSM), direct metal deposition (DMD), direct selective laser melting (DSLM), etc. However, any other forms of manufacturing (additive manufacturing-based or otherwise) applicable for the formation of the seal parts disclosed herein are possible. Furthermore, the manufacturing processes used to form the seal components can include use of any suitable material and/or combination of materials, including but not limited to a rene alloy (e.g., Rene 41, Rene 80, Rene 95, Rene 108, Rene N5, etc.) and/or other type of material that can be used for formation of the seal structure (e.g., nickel-based alloy, Haynes alloy, TMS alloy, etc.), as well as any such material that can be used in an additive manufacturing process.

The test results analyzer 1320 can be used to perform testing and/or analyze test results as part of the flow path hardware design and development (e.g., including the fairing structure 202 and/or the seal structure 1200) in order to meet regulatory and other established guidelines. The test results analyzer 1320 can use sensors placed on the fabricated structures, as well as on a gas turbine engine that may be tested using the fabricated structures, to determine performance at operating temperatures, identify thermal gradient profiles, perform full load full pressure testing, response to cooling flow path variations, etc. The test results analyzer 1320 can be used to test various materials (e.g., higher-grade materials versus lower-grade material) to determine their performance at operating conditions using the selected fairing structure and/or seal design(s). Furthermore, the test results analyzer 1320 can be used to determine how the testing results can vary if the structures are to be used in next generation engine architectures (e.g., geared architecture).

While an example implementation of the turbine frame generator 1300 is illustrated in FIG. 20, one or more of the elements, processes and/or devices illustrated in FIG. 20 may be combined, divided, re-arranged, omitted, eliminated and/or implemented in any other way. Further, the example parameter identifier 1305, the example fairing structure generator 1310, the example seal structure generator 1315, the example test results analyzer 1320, and/or, more generally, the example flow path hardware generator 1301 of FIG. 20 may be implemented by hardware, software, firmware and/or any combination of hardware, software and/or firmware. Thus, for example, any of the example parameter identifier 1305, the example fairing structure generator 1310, the example seal structure generator 1315, the example test results analyzer 1320, and/or, more generally, the example flow path hardware generator 1301 of FIG. 20 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter identifier 1305, the example fairing structure generator 1310, the example seal structure generator 1315, the example test results analyzer 1320, and/or, more generally, the example flow path hardware generator 1301 of FIG. 20 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flow path hardware generator 1301 of FIG. 20 may include one or more elements, processes and/or devices in addition to, or instead of, those illustrated in FIG. 20, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the flow path hardware generator 1301 of FIG. 20 are shown in FIGS. 21-24. The machine readable instructions may be one or more executable programs or portion(s) of an executable program for execution by a computer processor such as the processor or controller 100 discussed above in connection with FIG. 6. The program may be embodied in software stored on a non-transitory computer readable storage medium such as a CD-ROM, a floppy disk, a hard drive, a DVD, a Blu-ray disk, or a memory associated with the processor 100, but the entire program and/or parts thereof could alternatively be executed by a device other than the processor 100 and/or embodied in firmware or dedicated hardware. Further, although the example program is described with reference to the flowchart illustrated in FIGS. 21-24, many other methods of implementing the example flow path hardware generator 1301 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 21-24 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 21:
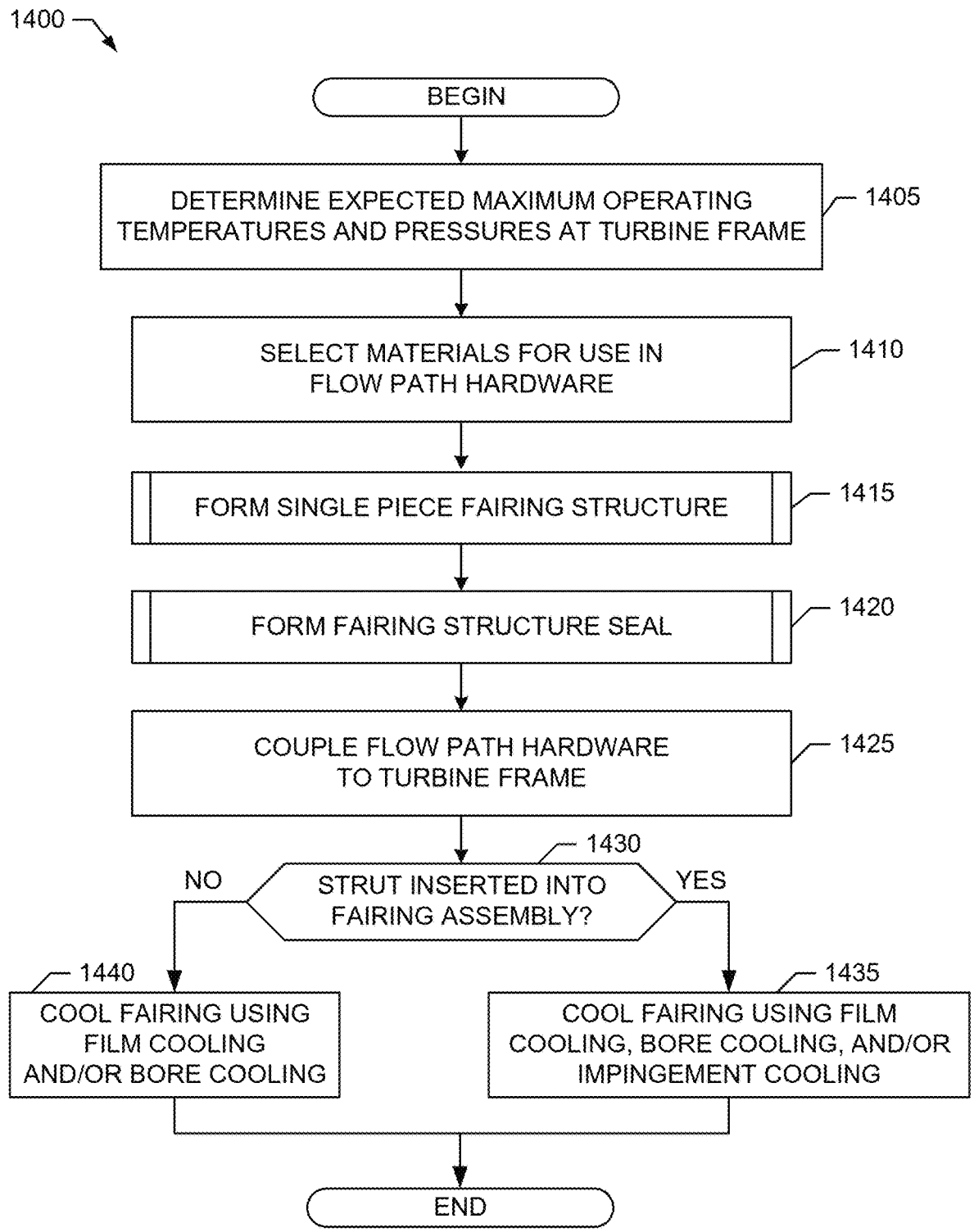
FIG. 21 illustrates a flowchart representative of example machine readable instructions which may be executed to implement the example flow path hardware generator of FIG. 20.

FIG. 21 illustrates a flowchart 2100 representative of example machine readable instructions which can be executed to implement the example flow path hardware generator 1301 of FIG. 20. The parameter identifier 1305 determines an expected maximum operating temperature (e.g., 1,000° C.) and pressure (e.g., 130 psia) at the turbine frame (block 1405), as well as other parameter values to determine the structure and/or properties of the materials to be used in the design and/or fabrication of flow path hardware (e.g., fairing 202, seal 1200, etc.). The flow path hardware generator 1301 determines materials (e.g., chrome alloys, titanium, aluminum, etc.) to be used in the flow path hardware design and/or fabrication process (block 1410). The fairing structure generator 1310 forms a single-piece fairing structure (block 1415) using a first manufacturing process (e.g., an additive manufacturing process and/or metal casting process). For example, the single-piece fairing structure includes fairing 202 components such as the vane(s) 208 that can be formed using nickel-based cast metallic alloys. The seal structure generator 1315 forms the fairing structure seal (block 1420) using the first manufacturing process and/or a second manufacturing process (e.g., chemo-mechanical process, thermo-mechanical process, etc.). Once the fairing structure 202 and seal structure 1200 are formed, the flow path hardware generator 1301 can form the full fairing assembly 200 for use in a turbine frame (e.g., turbine center frame, turbine vane frame, turbine rear frame, turbine mid frame, etc.) by attaching multiple fairing structures 202 together via the seal structures 1200 to form a continuing, circumferentially-extending structure. The flow path hardware generator 1301 then couples the flow path hardware (e.g., fairing, seal, etc.) to the turbine frame (e.g., turbine center frame, turbine vane frame, turbine rear frame, turbine mid frame, etc.) (block 1425). The flow path hardware generator 1301 can determine the type of cooling to be used in the flow path hardware system based on whether a strut is inserted into the hollow structure 212 of the vane. If the strut 902 is to be positioned within the fairing 202 (e.g., inside hollow structure 212) (block 1430), the cooling can include film cooling, bore cooling, and/or impingement cooling (block 1435). As such, the flow path hardware generator 1301 can determine whether the strut 902 should include a specific arrangement and/or positioning of holes (e.g., to allow impingement cooling and/or cooling via impingement baffle(s) of the strut 902). Additionally, if the strut 902 is not positioned within the fairing 202, the cooling of the fairing can occur using film cooling and/or bore cooling (block 1440).

Figure 22:
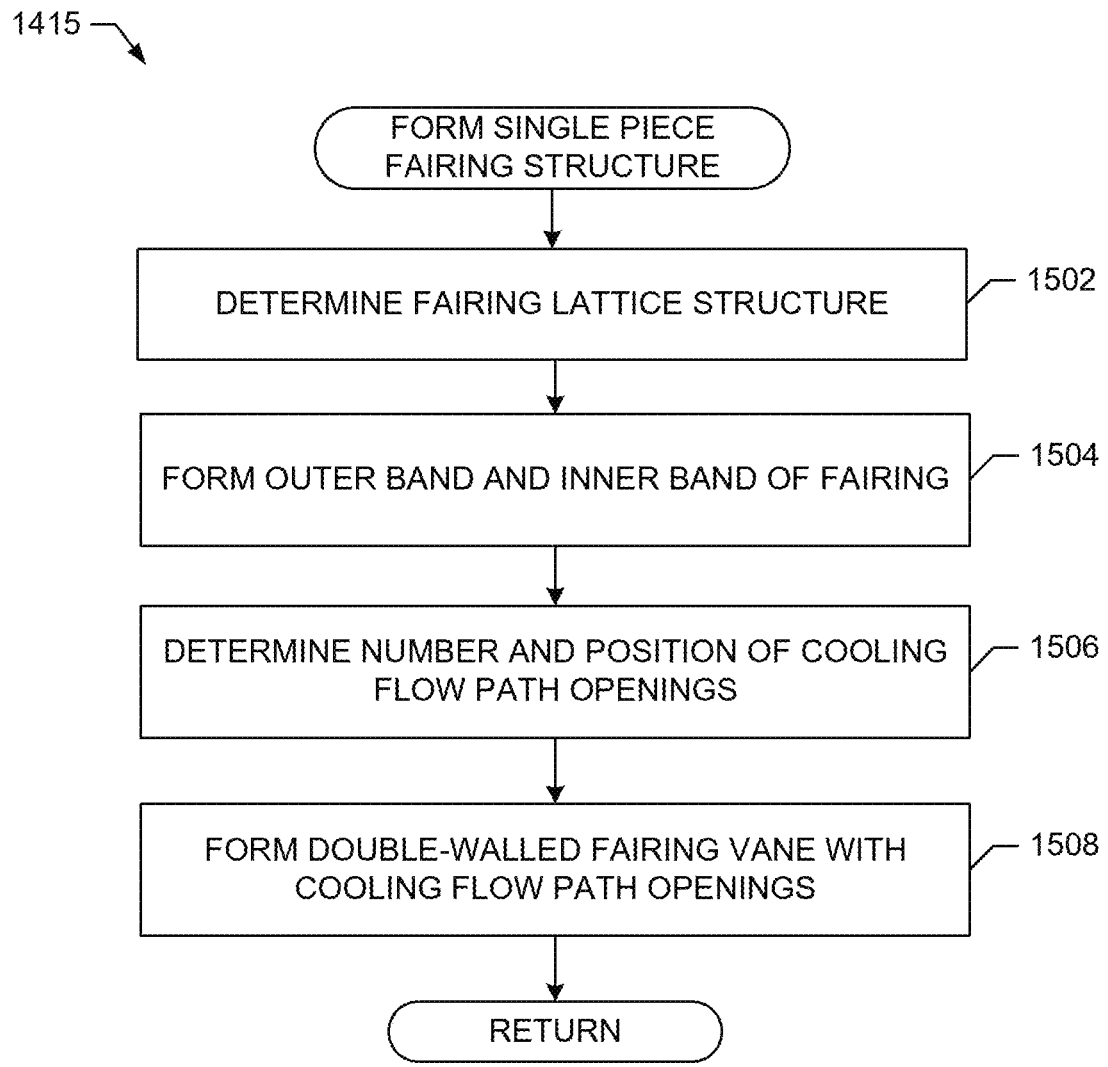
FIG. 22 illustrates a flowchart representative of example machine readable instructions which may be executed to implement a fairing structure generator as part of the example flow path hardware generator of FIG. 20.

FIG. 22 illustrates a flowchart 1415 representative of example machine readable instructions which can be executed to implement the fairing structure generator 1310 of the flow path hardware generator 131301 of FIG. 20. The fairing structure generator 1310 determines the fairing lattice structure 230 of the example fairing 202 of FIG. 9 (e.g., based on the parameter identifier 1305 values and/or other structural and/or functional property requirements of the fairing) (block 1502). The fairing structure generator 1310 forms the outer band 204 and/or the inner band 206 of the fairing 202 using a manufacturing process (e.g., additive manufacturing such as direct metal deposition and/or a metal casting process, etc.) (block 1504). The fairing structure generator 1310 can determine a number, geometry, positioning, and/or size of the vane openings 210 for routing of cooling flow based on assessment of cooling efficiency using a specific vane opening design (block 1506). The fairing structure generator 1310 can also generate a variety of fairing 202 lattice structures, cool air flow openings 210, as well as inner band 204 and/or outer band 206 designs in order to allow for testing and assessment (e.g., using the test results analyzer 1320) of the fairing structure performance under specific conditions (e.g., thermal, pressure, etc.). The fairing structure generator 1310 can use additive manufacturing to generate the various designs in order to reduce the time needed to form the parts, as compared to using traditional manufacturing techniques, while allowing a greater number of designs to be tested for comparison. Once a design is tested and verified in an engine-based operational setting (e.g., tested at maximum operating temperatures and pressures), the parts of the fairing (e.g., outer band 204, inner band 206, and/or seal(s) 1200) can be formed as a single-piece structure by attaching the fairing components together (e.g., using fasteners, bolts, brackets, etc.). The parts of the fairing can be combined to form a single structure using additive manufacturing (e.g., the fairing structure generator 1310 combines the outer band 204, the inner band 206, the vane 208, and or other fairing 202 structure to form a single-piece fairing 202). For example, once the number of openings 210 and/or the positioning of the openings 210 are determined, the fairing structure generator 1310 can form the double-walled fairing vane 208 that has the cooling flow path openings 210 and/or 302 embedded within its structure (e.g., in the inner vane structure 304 and the outer vane structure 306) using additive manufacturing process and/or injection molding (block 1508).

Figure 23:
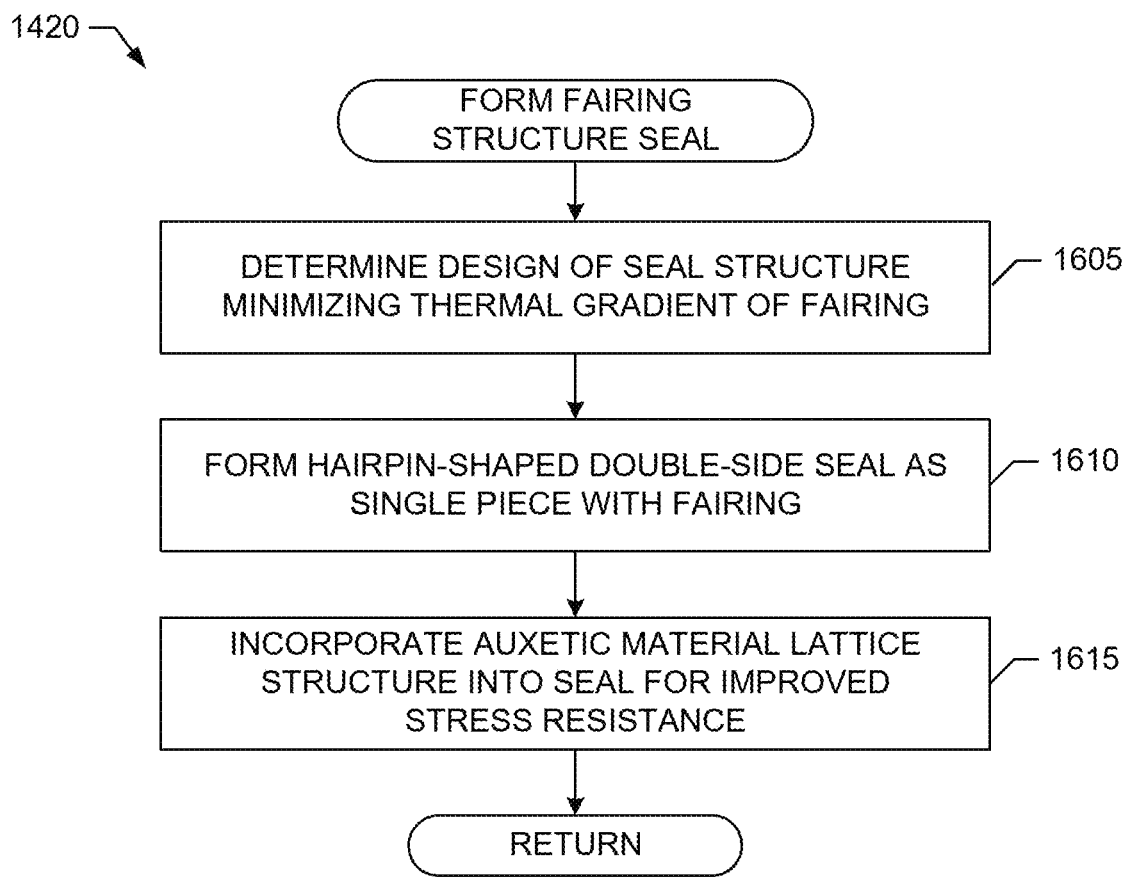
FIG. 23 illustrates a flowchart representative of example machine readable instructions which may be executed to implement a seal structure generator as part of the example flow path hardware generator FIG. 20.

FIG. 23 illustrates a flowchart 1420 representative of example machine readable instructions which can be executed to implement the seal structure generator 1315 of the flow path hardware generator 1301 of FIG. 20. The seal structure generator 1315 determines a design of the seal 1200 structure based on one or more parameter values identified by the parameter identifier 1305 (e.g., expected maximum temperatures, etc.). The seal structure generator 1315 can determine the seal structure design that reduces a thermal gradient of the fairing by using a finite element analysis model to predict thermal stresses (block 1605). Additionally, the seal structure generator 1315 can form a hairpin-shaped double-side seal (e.g., fairing edge 214) that can be used to secure adjacent fairing structures 202 by positioning the seal on the outer and/or inner edges 214 of the fairings (block 1610). However, any seal structure described herein or a variation thereof can be used to form a seal 1200 to allow the fairing structures 202 to be combined to form a fairing assembly 200. The seal structure generator 1315 further incorporates and/or embeds an auxetic material 1228 into the seal 1200 structure for improved stress resistance and decreased material stress fatigue using a molding and/or thermo-mechanical process (block 1615). The seal structure generator 1315 can use the test results analyzer 1320 to determine the type of geometry to be used for the auxetic structure within the seal 1200 (e.g., based on which geometry results in resistance to anticipated loads to be experienced at the fairing edges 214). For example, modeling of various auxetic structure geometries and anticipated loads at the fairing edges using finite element analysis can allow the seal structure generator 1315 to select one or more auxetic structure geometries that have a high tolerance to maximum anticipated loads at the fairing edges 214.

From the foregoing, it will be appreciated that the disclosed methods and apparatus permit improved turbine flow path hardware cooling. In the examples disclosed herein, a turbine fairing (e.g., TCF, TVF, TRF, etc.) can be formed as a single 360-degree component including flexible ligament sealing and/or a double-layer wall lattice structure in between. In some examples, cooling air can be used in between the double-layer wall lattice structure to control the bulk flow path hardware temperature. Improvement in the cooling of flow path hardware allows for replacement of existing materials used for manufacture of flow path hardware components (e.g., use of lower grade materials with lower temperature requirements, reduction of the expense associated with using higher grade materials, reduce component weight as a result of changing material(s) used in turbine frame, etc.) and/or allowing higher flow path temperatures to be used in combination with currently used materials given the ability to cool the flow path hardware components (e.g., reduce temperature-induced burden on flow path hardware components, increase cooling effectiveness, permit higher load carrying capacity, etc.). In some examples, the flow path hardware components described herein can be fabricated using additive manufacturing. As such, in the examples disclosed herein, the flow path hardware can be cooled or uncooled, depending on the intended application and/or material selection. In some examples, a new material (e.g., lower-grade material with a lower cost than, for example, a ceramic matrix composite (CMC)) can be used for the flow path hardware components, with cooling added using compressed air flow through the flow path hardware. In some examples, the double-walled fairing can be cooled using impingement cooling, bore cooling, and/or film cooling, etc. In some examples, the air can be recycled during the air-cooling process to allow for cooling of the entire double-walled, 360-degree single part fairing. The use of flow path hardware cooling, as described herein, can be applied in next generation high speed turbines (e.g., with geared architecture) to improve engine performance and hardware durability, for example.

While the examples disclosed herein describe gas turbine frame flow path hardware cooling in an example aircraft engine (e.g., engine 10 of FIG. 1), the methods and apparatus disclosed herein can be used in any turbine engine system. For example, the methods and apparatus disclosed herein can be applied to stationary gas turbine engines to generate power or electricity. Furthermore, the methods and apparatus disclosed herein can be used in any internal combustion engine with static and/or structural flow path hardware cooling. Likewise, while the examples disclosed herein use a turbine center frame (TCF) as an example turbine frame component in which the disclosed flow path hardware cooling methods and apparatus are applied, the use of the disclosed methods and apparatus are not limited to TCFs and can be applied in any type of turbine frame (e.g., turbine vane frame (TVF), turbine rear frame (TRF), turbine mid frame (TMF), and/or any other structural frame of an engine).

The presently described technology can be implemented according to a plurality of examples. In certain examples, the strut 902 provides a first means for directing cooling air flow, the first means for directing air flow to direct air flow radially inward through the fairing. In certain examples, the double-walled vane 208 further provides a second means for directing the cooling air flow, the second means to direct air flow from the first means through a double-wall of the fairing.

Further aspects are provided by the subject matter of the following clauses:

An aircraft engine assembly comprising: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

The aircraft engine assembly of one or more of these clauses, which further includes a tail cone, and wherein the electric machine is located within the tail cone.

The aircraft engine assembly of one or more of these clauses, wherein the low pressure shaft is oriented to extend through the intake channel such that an axial portion of the low pressure shaft is surrounded by the incoming flow of air in the intake channel.

The aircraft engine assembly of one or more of these clauses, wherein the electric machine is positioned to receive an impingement of the intake flow of air.

The aircraft engine assembly of one or more of these clauses, wherein an offtake flow of air is extracted from the intake flow of air, the offtake flow of air forming a cooling flow of air routed to the electric machine.

The aircraft engine assembly of one or more of these clauses, wherein the low pressure turbine includes variable stator vanes, wherein the gas turbine engine includes an engine controller, and wherein the variable stator vanes of the low pressure turbine are controlled by the controller to change position when the electric machine changes from a first power level to a second power level.

The aircraft engine assembly of one or more of these clauses, which further includes a propeller located on a forward end of the gas turbine engine and coupled via the low pressure shaft with the low pressure turbine, and which further includes a gearbox coupled between the low pressure shaft and the propeller.

The aircraft engine assembly of one or more of these clauses, which further includes a propeller located on a forward end of the gas turbine engine and coupled via the low pressure shaft with the low pressure turbine, and wherein the propeller is variable pitch propeller, and wherein the electric machine is coaxial with the low pressure shaft.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing the intake flow of air in the first axial flow direction toward the high pressure compressor.

An aircraft powerplant comprising: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; and an electric machine coupled to the low pressure shaft and located on an opposite side of the gas turbine engine from the propeller, the electric machine positioned to be cooled by a portion of the intake flow of air defined by the intake channel.

The aircraft powerplant of one or more of these clauses, which further includes an engine nacelle enclosing the gas turbine engine, the electric machine located in an enclosed space aft of the high pressure compressor.

The aircraft powerplant of one or more of these clauses, wherein the engine nacelle includes a discharge opening sized to permit discharge of the portion of the intake flow of air.

The aircraft powerplant of one or more of these clauses, wherein the electric machine is in a conductive heat exchange communication with the intake flow of air.

The aircraft powerplant of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing air in the first axial flow direction toward the high pressure compressor.

The aircraft powerplant of one or more of these clauses, wherein the gas turbine engine includes an engine controller, and wherein the engine controller commands a change in fuel flow rate to a combustion section of the gas turbine engine when the electric machine changes from a first power level to a second power level.

The aircraft powerplant of one or more of these clauses, wherein the low pressure turbine is a free turbine.

The aircraft powerplant of one or more of these clauses, an engine exhaust configured to receive an exhaust flow in the first axial flow direction from the low pressure turbine and discharge the exhaust flow having a second axial direction component reverse of the first axial direction.

A method of cooling an electric machine comprising: operating a gas turbine engine having a high pressure compressor, a high pressure turbine, and a high pressure shaft, the high pressure compressor coupled to the high pressure turbine via the high pressure shaft, the gas turbine engine also including a low pressure turbine coupled via a low pressure shaft with a propeller; receiving an incoming flow of air in an incoming flow of air direction into an intake channel of the gas turbine engine, the incoming flow of air used in a combustion process of the gas turbine engine, the intake channel forming an intake channel flow path and defining an intake flow air; turning the intake flow of air using the intake channel from the incoming flow of air direction to an axial flow direction of the gas turbine engine; and cooling an electric machine located aft of the low pressure turbine using the intake flow of air flowing through the intake channel flow path.

The method of cooling an electric machine of one or more of these clauses, wherein the cooling includes impingement cooling the electric machine using the intake flow of air.

The method of cooling an electric machine of one or more of these clauses, wherein turning the flow includes changing shape of the flow from a non-annular shape to an annular shape.

The method of cooling an electric machine of one or more of these clauses, wherein the electric machine is located in a tail cone located aft of the gas turbine engine.

An aircraft engine assembly including: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a propeller located on a forward end of the gas turbine engine and coupled via the low pressure shaft with the low pressure turbine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and a fairing including: an outer band and an inner band, the outer band and the inner band connected using a double-walled vane, the vane including openings to pass cooling air flow from the outer band to an airfoil of the fairing; and an end segment seal, the seal formed on an edge of the fairing using an auxetic material.

The aircraft engine assembly of any preceding clause, which further includes a tail cone, and wherein the electric machine is located within the tail cone.

The aircraft engine assembly of any preceding clause, wherein the low pressure shaft is oriented to extend through the intake channel such that an axial portion of the low pressure shaft is surrounded by the incoming flow of air in the intake channel.

The aircraft engine assembly of any preceding clause, wherein the electric machine is positioned to receive an impingement of the intake flow of air.

The aircraft engine assembly of any preceding clause, wherein an offtake flow of air is extracted from the intake flow of air, the offtake flow of air forming a cooling flow of air routed to the electric machine.

The aircraft engine assembly of any preceding clause, wherein the low pressure turbine includes variable stator vanes, wherein the gas turbine engine includes an engine controller, and wherein the variable stator vanes of the low pressure turbine are controlled by the engine controller to change position when the electric machine changes from a first power level to a second power level.

The aircraft engine assembly of any preceding clause, which further includes a propeller located on a forward end of the gas turbine engine and coupled via the low pressure shaft with the low pressure turbine, and which further includes a gearbox coupled between the low pressure shaft and the propeller.

The aircraft engine assembly of any preceding clause, which further includes a propeller located on a forward end of the gas turbine engine and coupled via the low pressure shaft with the low pressure turbine, and wherein the propeller is a variable pitch propeller, and wherein the electric machine is coaxial with the low pressure shaft.

The aircraft engine assembly of any preceding clause, wherein the fairing is a single-piece fairing.

The aircraft engine assembly of any preceding clause, wherein the fairing includes a lattice structure, the lattice structure to reduce fairing weight.

The aircraft engine assembly of any preceding clause, wherein the fairing forms at least one of a turbine center frame, a turbine vane frame, a turbine rear frame, or a turbine mid frame.

The aircraft engine assembly of any preceding clause, wherein the fairing is positioned between a high pressure spool and a low pressure spool, the fairing to pass flow path air from a high pressure turbine to a low pressure turbine.

The aircraft engine assembly of any preceding clause, wherein the seal is formed to permit contraction in a lateral direction as a result of a compressive force acting on the seal.

The aircraft engine assembly of any preceding clause, wherein the seal is formed to reduce a thermal gradient at an edge of the fairing.

The aircraft engine assembly of any preceding clause, wherein the seal is formed using a hairpin-like structure, the hairpin-like structure to be symmetrical on both sides of the seal.

The aircraft engine assembly of any preceding clause, wherein the seal is to be stretched due to thermally-induced material expansion to cause the seal to thicken.

The aircraft engine assembly of any preceding clause, wherein the fairing is cooled using at least one of a film cooling, a bore cooling, or an impingement cooling.

The aircraft engine assembly of any preceding clause, wherein the impingement cooling includes impingement baffle-based cooling originating from baffles of a strut pierced with impingement cooling holes.

The aircraft engine assembly of any preceding clause, wherein the double-walled vane is formed using additive manufacturing.

An aircraft powerplant including: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; an electric machine coupled to the low pressure shaft and located on an opposite side of the gas turbine engine from the propeller, the electric machine positioned to be cooled by a portion of the intake flow of air defined by the intake channel; and a fairing including: an outer band and an inner band, the outer band and the inner band connected using a double-walled vane, the vane including openings to pass cooling air flow from the outer band to an airfoil of the fairing; and an end segment seal, the seal formed on an edge of the fairing using an auxetic material.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

We claim:

1. An aircraft engine assembly comprising:
   a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine;
   a propeller located on a forward end of the gas turbine engine and coupled via the low pressure shaft with the low pressure turbine;
   an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction;
   an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and
   a fairing including:
      an outer band and an inner band, the outer band and the inner band connected using a double-walled vane, the vane including openings to pass cooling air flow from the outer band to an airfoil of the fairing; and
      an end segment seal, the seal formed on an edge of the fairing using an auxetic material.

2. The aircraft engine assembly of claim 1, which further includes a tail cone, and wherein the electric machine is located within the tail cone.

3. The aircraft engine assembly of claim 1, wherein the low pressure shaft is oriented to extend through the intake channel such that an axial portion of the low pressure shaft is surrounded by the incoming flow of air in the intake channel.

4. The aircraft engine assembly of claim 1, wherein the electric machine is positioned to receive an impingement of the intake flow of air.

5. The aircraft engine assembly of claim 1, wherein an offtake flow of air is extracted from the intake flow of air, the offtake flow of air forming a cooling flow of air routed to the electric machine.

6. The aircraft engine assembly of claim 1, wherein the low pressure turbine includes variable stator vanes, wherein the gas turbine engine includes an engine controller, and wherein the variable stator vanes of the low pressure turbine are controlled by the engine controller to change position when the electric machine changes from a first power level to a second power level.

7. The aircraft engine assembly of claim 1, which further includes a propeller located on a forward end of the gas turbine engine and coupled via the low pressure shaft with the low pressure turbine, and which further includes a gearbox coupled between the low pressure shaft and the propeller.

8. The aircraft engine assembly of claim 1, which further includes a propeller located on a forward end of the gas turbine engine and coupled via the low pressure shaft with the low pressure turbine, and wherein the propeller is a variable pitch propeller, and wherein the electric machine is coaxial with the low pressure shaft.

9. The aircraft engine assembly of claim 1, wherein the fairing is a single-piece fairing.

10. The aircraft engine assembly of claim 1, wherein the fairing includes a lattice structure, the lattice structure to reduce fairing weight.

11. The aircraft engine assembly of claim 1, wherein the fairing forms at least one of a turbine center frame, a turbine vane frame, a turbine rear frame, or a turbine mid frame.

12. The aircraft engine assembly of claim 1, wherein the fairing is positioned between a high pressure spool and a low pressure spool, the fairing to pass flow path air from a high pressure turbine to a low pressure turbine.

13. The aircraft engine assembly of claim 1, wherein the seal is formed to permit contraction in a lateral direction as a result of a compressive force acting on the seal.

14. The aircraft engine assembly of claim 1, wherein the seal is formed to reduce a thermal gradient at an edge of the fairing.

15. The aircraft engine assembly of claim 1, wherein the seal is formed using a hairpin-like structure, the hairpin-like structure to be symmetrical on both sides of the seal.

16. The aircraft engine assembly of claim 1, wherein the seal is to be stretched due to thermally-induced material expansion to cause the seal to thicken.

17. The aircraft engine assembly of claim 1, wherein the fairing is cooled using at least one of a film cooling, a bore cooling, or an impingement cooling.

18. The aircraft engine assembly of claim 17, wherein the impingement cooling includes impingement baffle-based cooling originating from baffles of a strut pierced with impingement cooling holes.

19. The aircraft engine assembly of claim 1, wherein the double-walled vane is formed using additive manufacturing.

20. An aircraft powerplant comprising:
- a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine;
- a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine;
- an intake channel defining an intake flow of air in fluid communication with the gas turbine engine, the intake channel configured to reverse the intake flow of air initially flowing in the freestream direction to the first axial flow direction of the gas turbine engine;
- an electric machine coupled to the low pressure shaft and located on an opposite side of the gas turbine engine from the propeller, the electric machine positioned to be cooled by a portion of the intake flow of air defined by the intake channel; and
- a fairing including:
  - an outer band and an inner band, the outer band and the inner band connected using a double-walled vane, the vane including openings to pass cooling air flow from the outer band to an airfoil of the fairing; and
  - an end segment seal, the seal formed on an edge of the fairing using an auxetic material.

* * * * *